(12) United States Patent
Sowder

(10) Patent No.: US 7,370,431 B2
(45) Date of Patent: May 13, 2008

(54) PIPEFITTING INSTRUMENTS AND RELATED METHODS

(75) Inventor: George Wesley Sowder, Evanston, WY (US)

(73) Assignee: The Minds Imagination, LLC, Evanston, WY (US)

( * ) Notice: Subject to any disclaimer, the term of this patent is extended or adjusted under 35 U.S.C. 154(b) by 0 days.

(21) Appl. No.: 11/626,180

(22) Filed: Jan. 23, 2007

(65) Prior Publication Data

US 2007/0175057 A1 Aug. 2, 2007

Related U.S. Application Data

(60) Provisional application No. 60/761,140, filed on Jan. 23, 2006.

(51) Int. Cl.
*G01B 5/25* (2006.01)
(52) U.S. Cl. ............................. 33/529; 33/534; 33/370; 33/412
(58) Field of Classification Search ................. 33/529, 33/533–534, 343, 370–373, 1 N, 412
See application file for complete search history.

(56) References Cited

U.S. PATENT DOCUMENTS

| | | | |
|---|---|---|---|
| 3,545,086 A | 12/1970 | Brill et al. | |
| 4,120,095 A | 10/1978 | Lebourg | |
| 6,385,856 B1 * | 5/2002 | Godin | 33/343 |
| 6,505,412 B2 * | 1/2003 | Hauzie, Jr. | 33/529 |
| 6,560,887 B2 * | 5/2003 | Byrnes | 33/534 |
| 7,178,252 B1 * | 2/2007 | Belgard | 33/412 |
| 7,240,437 B1 * | 7/2007 | Moldovan | 33/529 |
| 2002/0088132 A1 | 7/2002 | Byrnes | |
| 2002/0092191 A1 | 7/2002 | Hauzie, Jr. | |

OTHER PUBLICATIONS

PCT Search Report and Written Opinion in PCT/US2007/002040 date of mailing Aug. 7, 2007 (16pp.).

* cited by examiner

*Primary Examiner*—Yaritza Guadalupe-McCall
(74) *Attorney, Agent, or Firm*—Fish & Richardson P.C.

(57) ABSTRACT

A pipefitting instrument includes a main body member, a carriage slidably connected to the main body member, and a protractor member pivotally connected to the carriage. The protractor member includes a protractor scale operable to measure an angular orientation of the protractor member relative to the main body member. The instrument also includes a mounting member slidably connected to the main body member and configured to releasably attach to a pipe flange.

21 Claims, 22 Drawing Sheets

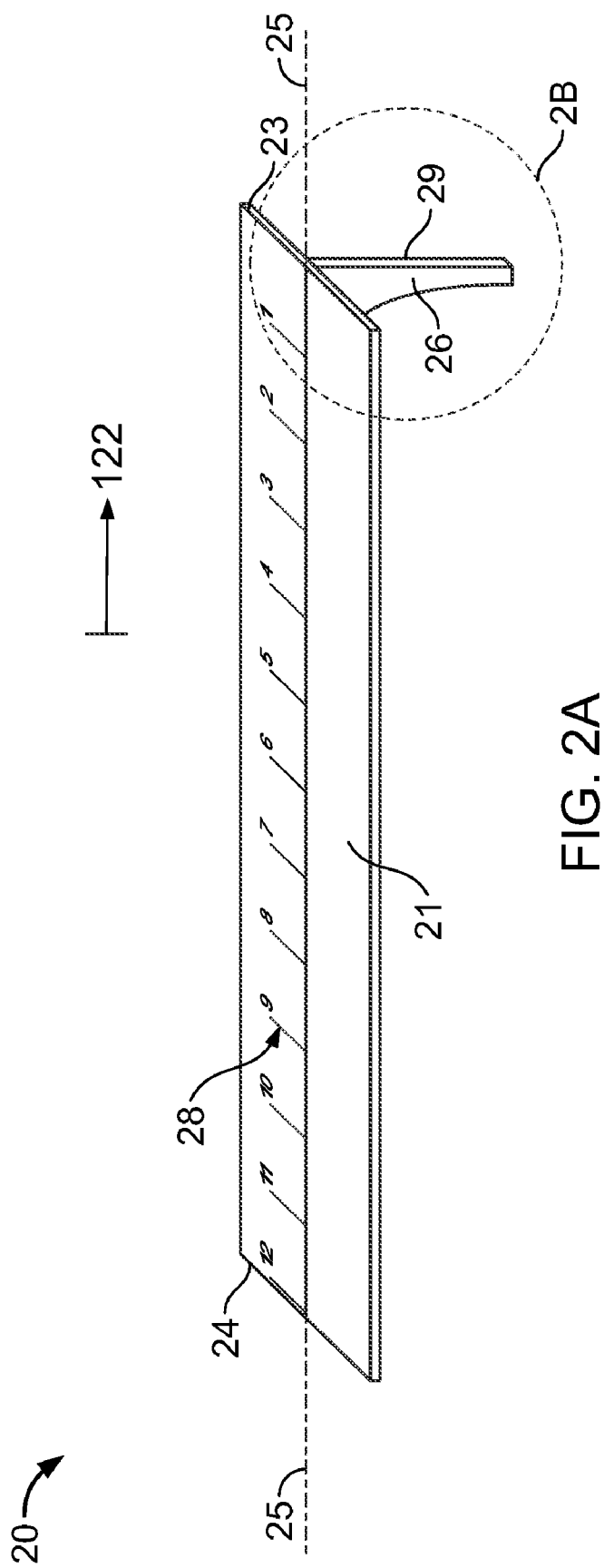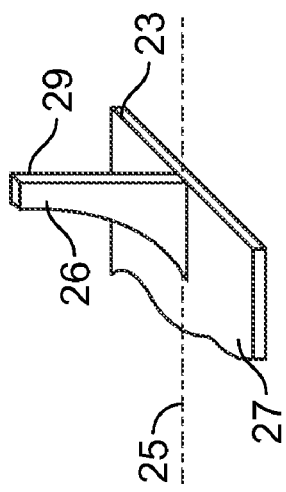

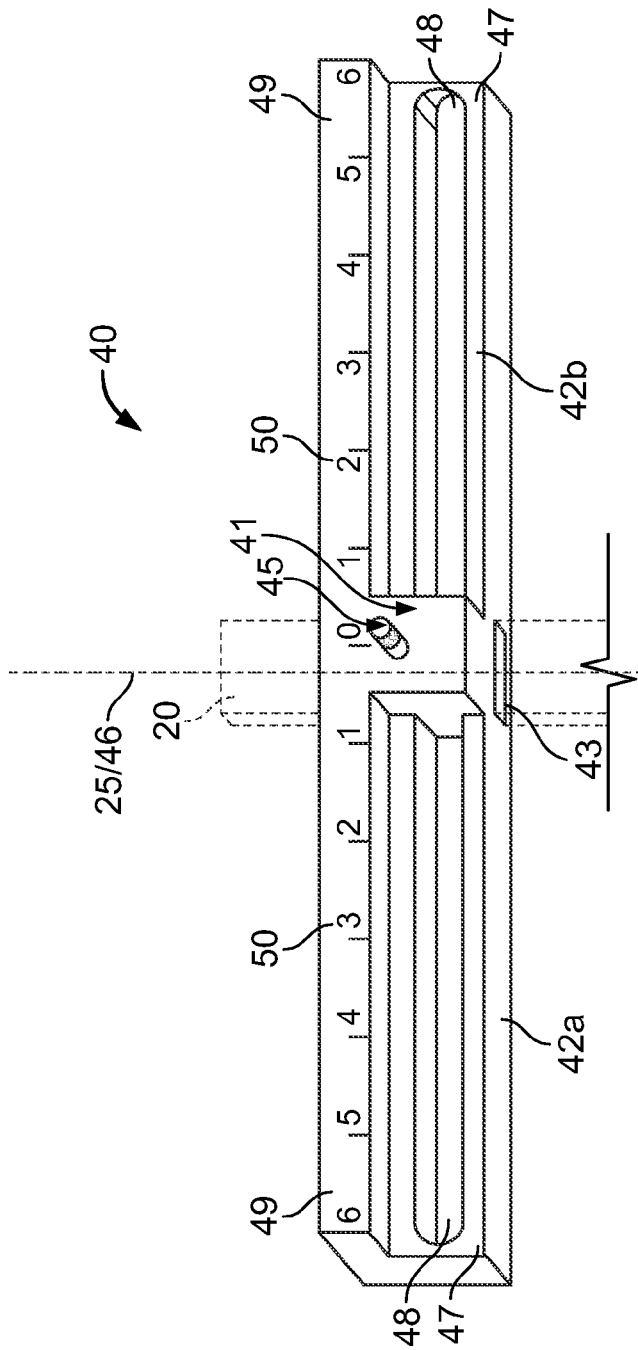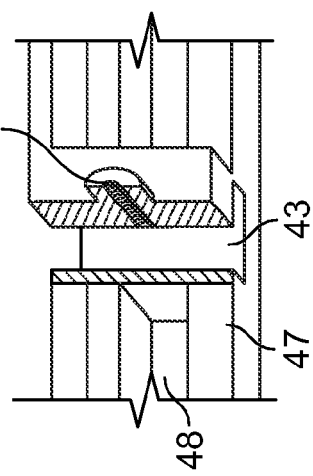

PIPEFITTING INSTRUMENTS AND RELATED METHODS

CROSS-REFERENCE TO RELATED APPLICATIONS

This application claims the benefit of the filing date of U.S. Provisional Application No. 60/761,140, which was filed on Jan. 23, 2006. The contents of U.S. Application No. 60/761,140 are incorporated by reference as part of this application.

TECHNICAL FIELD

This disclosure relates to pipefitting instruments and related methods

BACKGROUND

Pipefitting includes the assemblage of sequential segments of pipe (e.g., for transportation of fluids, gases, etc.) and securing the segments in position corresponding to a predetermined layout. Adjacent pipes segments are often connected through mating pipe flanges each including a plurality of mounting holes circumferentially spaced about a central axis of the corresponding pipe section. The pipe flanges of successive segments can be aligned such that their respective mountings holes are arranged coaxially, thereby allowing the flanges to be fastened to each other, e.g., by passing threaded bolts through the mounting holes.

Known methods for aligning sequential segments of pipe include positioning individual pieces (i.e., flanges and pipes) of each pipe segment according to a predetermined layout at a work site, and forming a preliminary connection (e.g., by tack welding) between the individual pieces of each pipe segment. A final connection can then be form by completing the welds between the individual pieces. Since some of the initial alignment is often performed by visual approximation, some of the pipe segments may not align as intended following the final connection, and the process may have to be repeated for those misaligned pipe segments.

SUMMARY

In general, this disclosure relates to pipefitting instruments and related methods. The instruments can be used, for example, to align and position individual pieces of adjoining pipe segments according to a predetermined layout prior to welding them into finished pipe segments.

According to one aspect, a pipefitting instrument includes a main body member, a carriage slidably connected to the main body member, and a protractor member pivotally connected to the carriage. The protractor member includes a protractor scale operable to measure an angular orientation of the protractor member relative to the main body member. The instrument also includes a mounting member slidably connected to the main body member and configured to releasably attach to a pipe flange.

In another aspect, a method includes mounting a graduated instrument to adjacent ones of a plurality of mounting holes of a first pipe flange and measuring an angular orientation of the mounting holes of the first pipe flange relative to a central axis of a second pipe flange with the graduated instrument. The method also includes adjusting a position of a third pipe flange relative to an elbow joint based at least in part on the measured angular orientation, and welding the third pipe flange to the elbow joint in the adjusted position.

Embodiments can include one or more of the following features.

In some embodiments, the instrument can also include a level connected to the protractor member.

In some implementations, the mounting member can include a series of graduations corresponding to measured distances relative to the main body member.

In some embodiments, the mounting member includes a first mounting arm having an elongate slot, and the series of graduations correspond to measured distances along the slot relative to the main body member.

In some implementations, the mounting member includes a first mounting pin that is linearly displaceable along the elongate slot and operable to form a releasable connection with a mounting hole of a pipe flange, during use.

In some embodiments the mounting member can also include a second mounting arm including a second elongate slot, and a second mounting pin linearly displaceable along the second elongate slot, and wherein the mounting member is operable to mount the main body member between adjacent mounting holes of a pipe flange, during use.

In some implementations the first mounting pin includes a position marker configured to cooperate with the series of graduations to provide a measurement corresponding to a position of the mounting pin relative to the main body member.

In some embodiments, the first mounting pin is configured for self-centering engagement with a mounting hole of a pipe flange.

In some implementations, the first mounting pin can include a first pin member comprising a first tapered surface and a second pin member configured to releasably engage the first pin member and comprising a second tapered surface. The first and second tapered surfaces are operable to substantially center the mounting pin within a mounting hole. The first mounting pin can also include a first fastener configured to releasably engage the first pin member and operable to inhibit linear displacement of the first mounting pin relative to the mounting member.

In some embodiments, the first fastener is operable to connect the mounting member to the first mounting pin.

In some implementations, the protractor member includes a releasable fastener operably to inhibit movement of the protractor member relative to the main body member.

In some embodiments, the mounting member includes a first releasable fastener operable to inhibit linear displacement of the body member relative to the mounting member.

In some implementations, the main body member includes a projection extending outwardly from a first surface of the main body member and operable to limit linear displacement of the main body member in a first direction, relative to the mounting member, during use.

In some embodiments, the main body member includes a sequence of graduations corresponding to measured distances relative to the projection, and the carriage includes a position marker being operable, in cooperation with the sequence of graduations, to measure a position of an axis of rotation of the protractor member relative to the main body member.

In some implementations, the carriage includes a releasable fastener operable to inhibit linear displacement of the carriage relative to the main body member.

In some embodiments, the carriage includes a position marker configured to cooperate with the protractor scale to provide a measurement for an angular orientation of the protractor member relative to the main body member.

In some implementations, the graduated instrument includes a spirit level.

In some embodiments, adjusting the position of the third pipe flange relative to the elbow joint can include mounting the graduated instrument to the third pipe flange, adjusting the spirit level to a predetermined angle relative to the third pipe flange, and rotating the third flange, relative to the elbow joint, to a position where the spirit level indicates a level orientation of the graduated instrument.

In some implementations, the predetermined angle corresponds to the measured angular orientation.

In some embodiments, the methods includes mounting the third pipe flange to the first pipe flange such that a central axis of the elbow joint is substantially co-axially aligned with the central axis of the second pipe flange, and such that at least one of a plurality of mounting holes of the third pipe flange is substantially aligned with a corresponding one of the plurality of mounting holes of the first pipe flange.

In some implementations, a central axis of the first pipe flange is substantially perpendicular to the central axis of the second pipe flange.

Other aspects, features, and advantages are in the description, drawings, and claims.

DESCRIPTION OF DRAWINGS

FIG. 2A is a perspective view of a main body member of a pipefitting instrument.

FIG. 2B is a detailed view of a projection of the main body member of FIG. 2A.

FIG. 3A is a perspective view of a mounting member of a pipefitting instrument.

FIG. 3B is a detailed sectional view of the mounting member of FIG. 3A.

DETAILED DESCRIPTION

Figure 1:
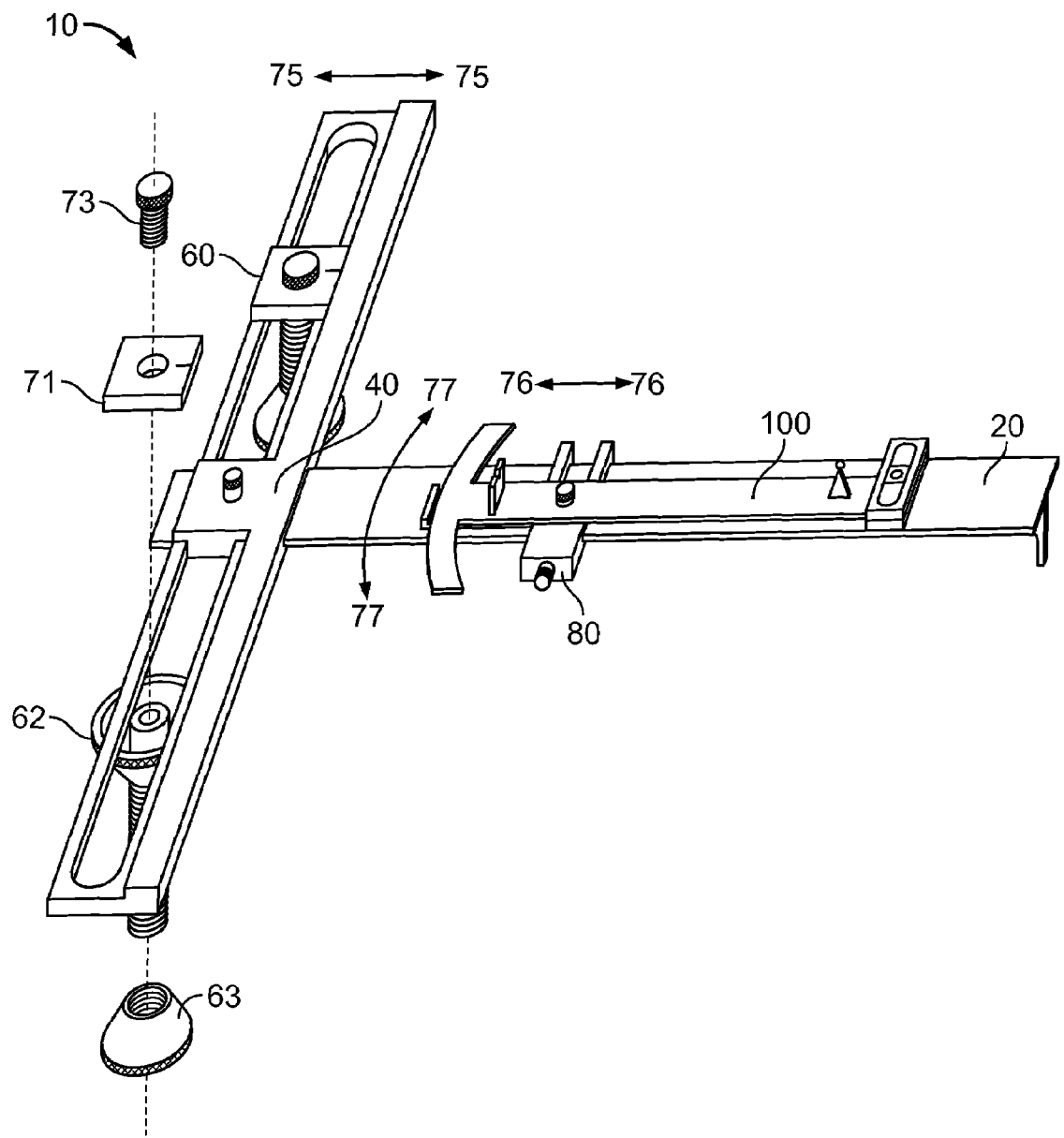
FIG. 1 is a perspective view of a pipefitting instrument.

Referring to FIG. 1, a pipefitting instrument 10 includes a main body member 20, a mounting member 40, mounting hardware 60, a carriage 80, and a protractor member 100. As shown in FIG. 1, the mounting member is connected to the main body member 20 and linearly displaceable relative thereto (as indicated by arrows 75). The carriage 80 is also connected and linearly displaceable relative to the main body member 20 (as indicated by arrows 76). The protractor member 60 is pivotally connected to the carriage 80 (as indicated by arrows 77).

Referring to FIGS. 2A and 2B, the main body member 20 includes an elongate body 21 extending from a first end 23 toward a second end 24 along a longitudinal axis 25. As shown in FIG. 2B, the main body member 20 includes a projection 26 that extends outwardly from a bottom surface 27 of the main body member 20. During use, described in greater detail below, the projection 26 operates to inhibit movement of the main body member 20 (i.e., relative to the mounting member 30) in a first direction 122. The main body member 20 also includes a sequence of ruled graduations 28, which extend along the longitudinal axis 25. The ruled graduations 28 correspond to measured distances relative to a first, reference edge of 29 the projection 26.

Referring to FIGS. 3A and 3B, the mounting member 40 includes a center stock 41 and a pair of mounting arms (i.e., first and second mounting arms 42a, 42b, respectively), which extend outwardly from the center stock 41. The center stock 41 defines a first opening 43 sized to receive the main body member 20 (shown in hidden lines), such that the main body member 20 is slidable within the first opening 43. The center stock 41 also includes a threaded through-hole 44 (FIG. 3B) in communication with the first opening 43. The through-hole 44 is configured to receive a first threaded fastener 45. The first threaded fastener 45 can be adjusted within the through-hole 44 to inhibit or prevent movement of the main body member 20 within the opening 43 (i.e., the first threaded fastener 45 can be tightened into contact with the main body member to inhibit or prevent linear displacement of the main body member 20 relative to the mounting member 30).

As shown in FIG. 3A, the first and second mounting arms 42a, 42b are arranged substantially symmetrically about a centerline 46 of the opening 43. The centerline 46 is substantially aligned with the longitudinal axis 25 of the main body member 20. Each of the mounting arms 42a, 42b include a recessed ledge 47 defining an elongate slot 48, and an elevated ledge 49 having an associated series of graduations 50 corresponding to measured distances, along the mounting arms 42a, 42b, relative to the centerline 46 of the opening 43 (i.e., relative to the longitudinal axis 25 of the main body member 20).

Figure 4A:
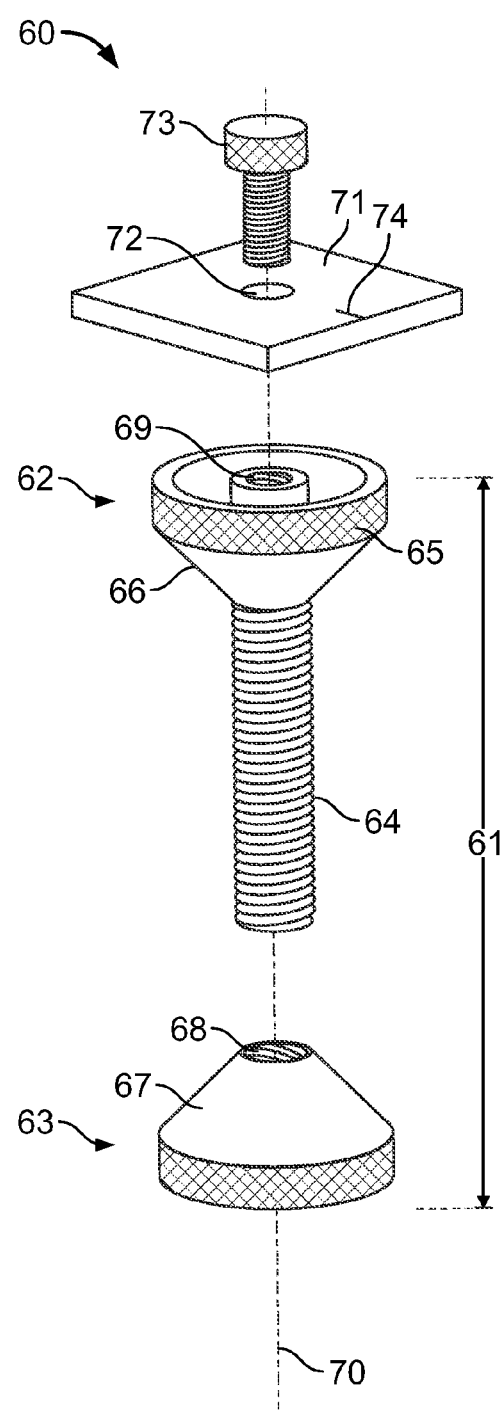
FIG. 4A is an exploded assembly view of a two-hole pin.
Figure 4B:
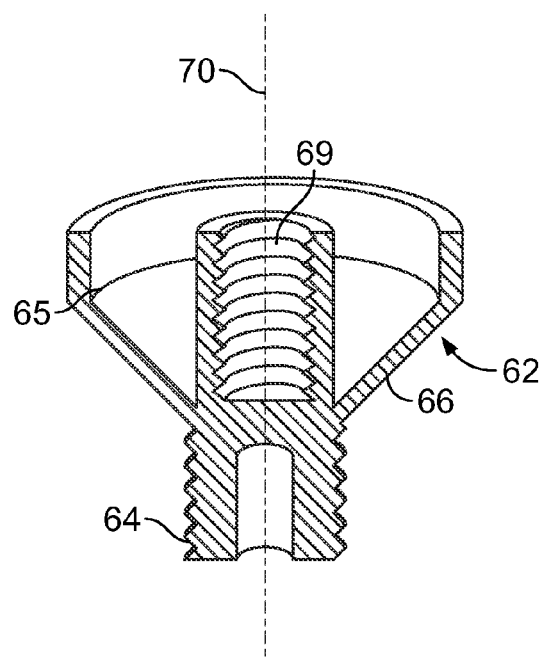
FIG. 4B is a detailed cross-sectional view of a first member of the two-hole pin of FIG. 4A.
Figure 4C:
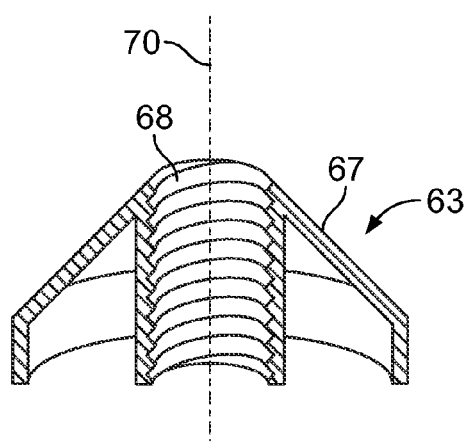
FIG. 4C is a detailed cross-sectional view of a second member of the two-hole pin of FIG. 4A.

Referring to FIGS. 4A-4C, the mounting hardware 60 includes a pair of two-hole pins 61 (only one shown in FIG. 4A). Each of the two-hole pins 61 includes a first pin member 62 and a mating, second pin member 63. As shown in FIGS. 4A and 4B, the first pin member 62 includes a threaded bolt 64 and a head 65 having a first tapered surface 66. The first pin member 62 also includes a threaded counter-bore 69 disposed concentrically about a central axis 70 of the two-hole pin 61. The threaded counter-bore 70 is configured for releasable engagement with a second threaded fastener 73. The second pin member 63 includes a second tapered surface 67 and a threaded hole 68 configured to releasably engage the threaded bolt 64 of the first pin member 62, as shown in FIGS. 4A and 4C.

The mounting hardware 60 also includes a pair of plates 71, each including a through hole 72 sized to received the second threaded fastener 73. The second threaded fastener 73 releasably engages the threaded counter-bore 69 of the two-holes pin 61 and forms a connection between the two-hole pin 61 and the plate 71 at opposing sides of the mounting member 30 through the elongate slots 48 (as shown, e.g., in FIG. 1). When connected, the plate 71 and the corresponding two-hole pin 61 are together linearly displaceable (e.g., slidable) along an associated one of the elongate slots 37. Each plate 71 includes a position marker 74 that operates cooperatively with the series of graduations 50 to provide a measurement corresponding to a position of the central axis 70 of the associated one of the mounting pins 61 relative to the longitudinal axis 25 of the main body member 20.

Figure 5A:
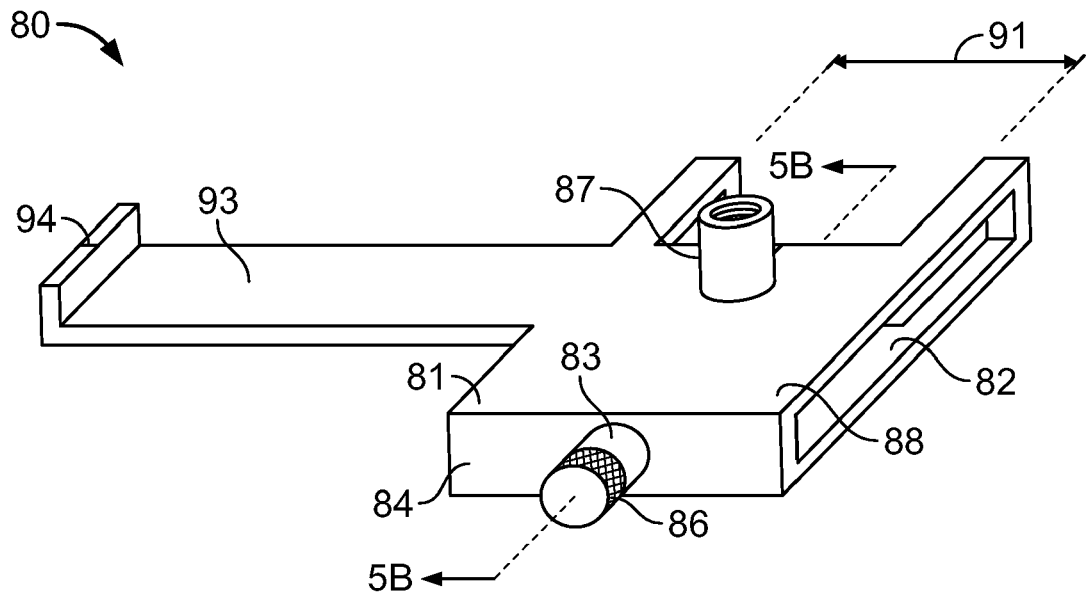
FIG. 5A is a perspective view of a carriage of a pipefitting instrument.
Figure 5B:
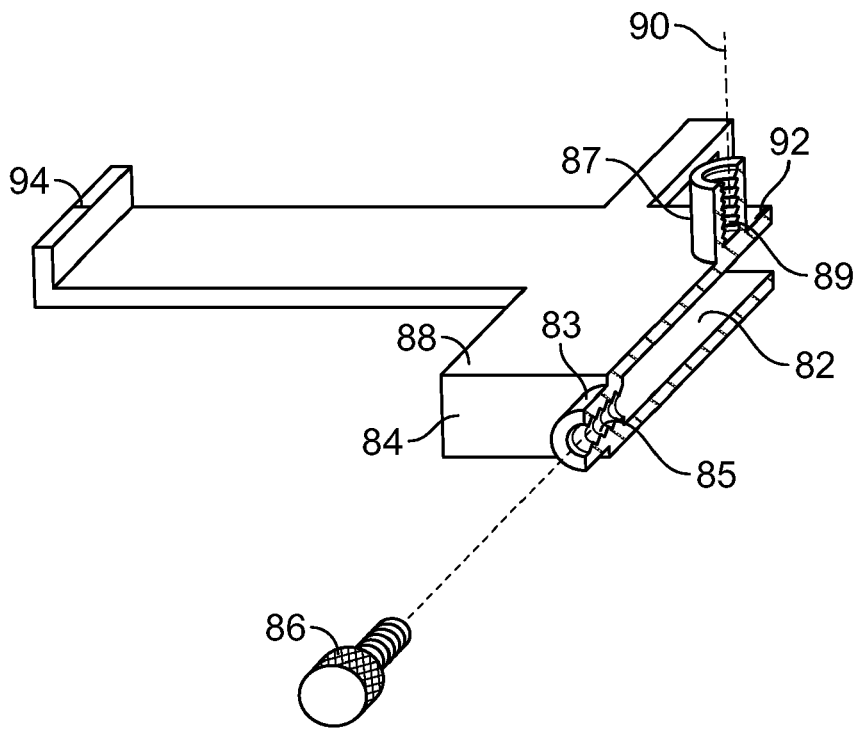
FIG. 5B is a cross-sectional view of the carriage of FIG. 5A.

Referring to FIGS. 5A and 5B, the carriage 80 includes a carriage body 81, which defines a second opening 82 sized to allow the main body member 20 to pass through; i.e., such that the carriage 80 is linearly displaceable (e.g., slidable) along the longitudinal axis 25 between the mounting member 40 and the projection 26 of the main body member 20. As shown in FIGS. 5A and 5B, the carriage 80 includes a first protrusion 83 extending outwardly from a first surface 84 of the carriage body 81. The carriage 80 also includes a threaded hole 85 extending through the first protrusion 83 and in communication with the second opening 82. The threaded hole 85 is configured for releasable engagement with a third threaded fastener 86. The third threaded fastener 86 can be adjusted within the threaded hole 85 to inhibit or prevent displacement of the carriage 80 relative to the main body member 20. More specifically, the third threaded fastener 86 can be tightened into contact with the main body member 20, thereby locking the carriage 80 against movement relative to the main body member 20.

The carriage 80 also includes a second protrusion 87 extending upwardly from a second surface 88 of the carriage body 81. The second protrusion 87 includes a threaded counter-bore 89 forming part of a releasable connection with the protractor member 100 (described in greater detail below). The second protrusion 87 is arranged such that a center line 90 of the counter-bore 89 is perpendicularly aligned with the longitudinal axis 25 of the main body member 20. The center line 90 of the counter-bore 89 is also coaxial with an axis of rotation 101 of the protractor member 100 (FIG. 6A).

The carriage body 81 also defines a window 91, extending from the second surface 88 into the second opening 82, through which the sequence of ruled graduations 28 of the main body member 20 are visible. The carriage body 81 also includes a second position marker 92 substantially aligned with the centerline 90 of the counter-bore 89. The second position marker 92 operates, in cooperation with the sequence of ruled graduations 28, to provide a measurement corresponding to a position of the axis of rotation 101 of the protractor member 101 (i.e., the center line 90 of the counter-bore 89) relative to the main body member 20.

Referring to FIG. 5A, the carriage also includes a cantilever arm 93 which extends outwardly from the carriage body 81 and parallel to the longitudinal axis 25 of the main body member 20. The cantilever arm 93 includes a third position marker 94 that operates cooperatively with the protractor member 100 to provide a measurement corresponding to an angular orientation of the protractor member 100 relative to the carriage 80 and/or the main body member 20.

Figure 6A:
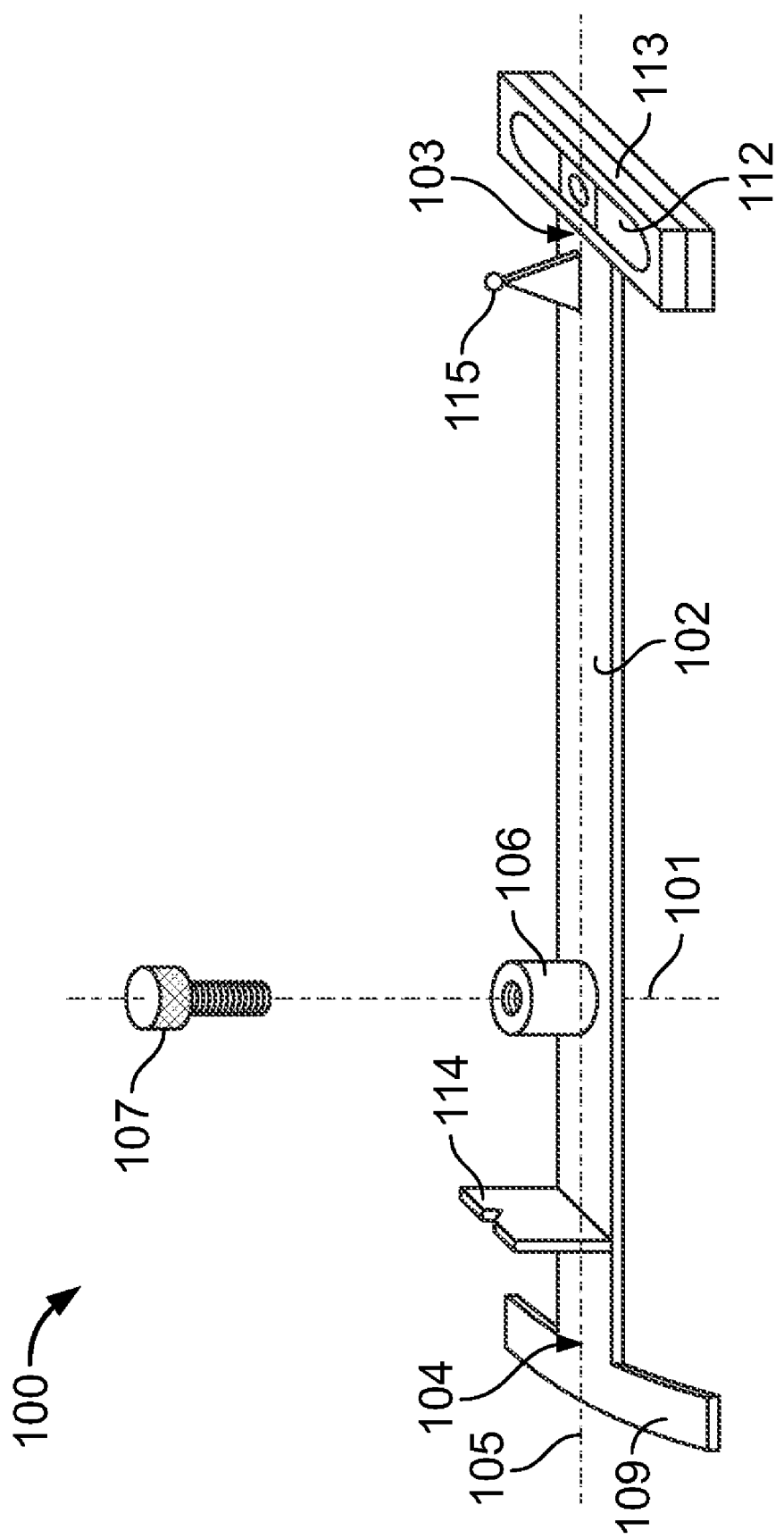
FIG. 6A is a perspective view of a protractor member.
Figure 6B:
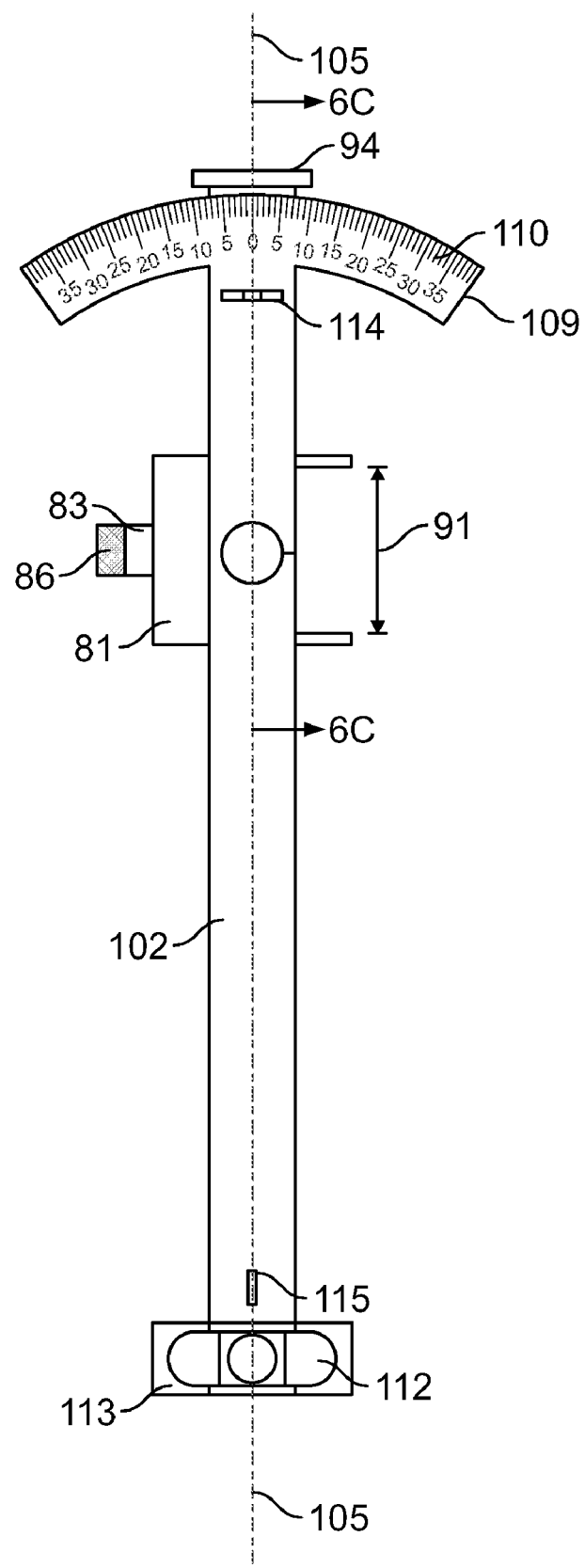
FIGS. 6B and 6C are plan and cross-sectional views of a protractor member and carriage assembly of a pipefitting instrument.
Figure 6C:
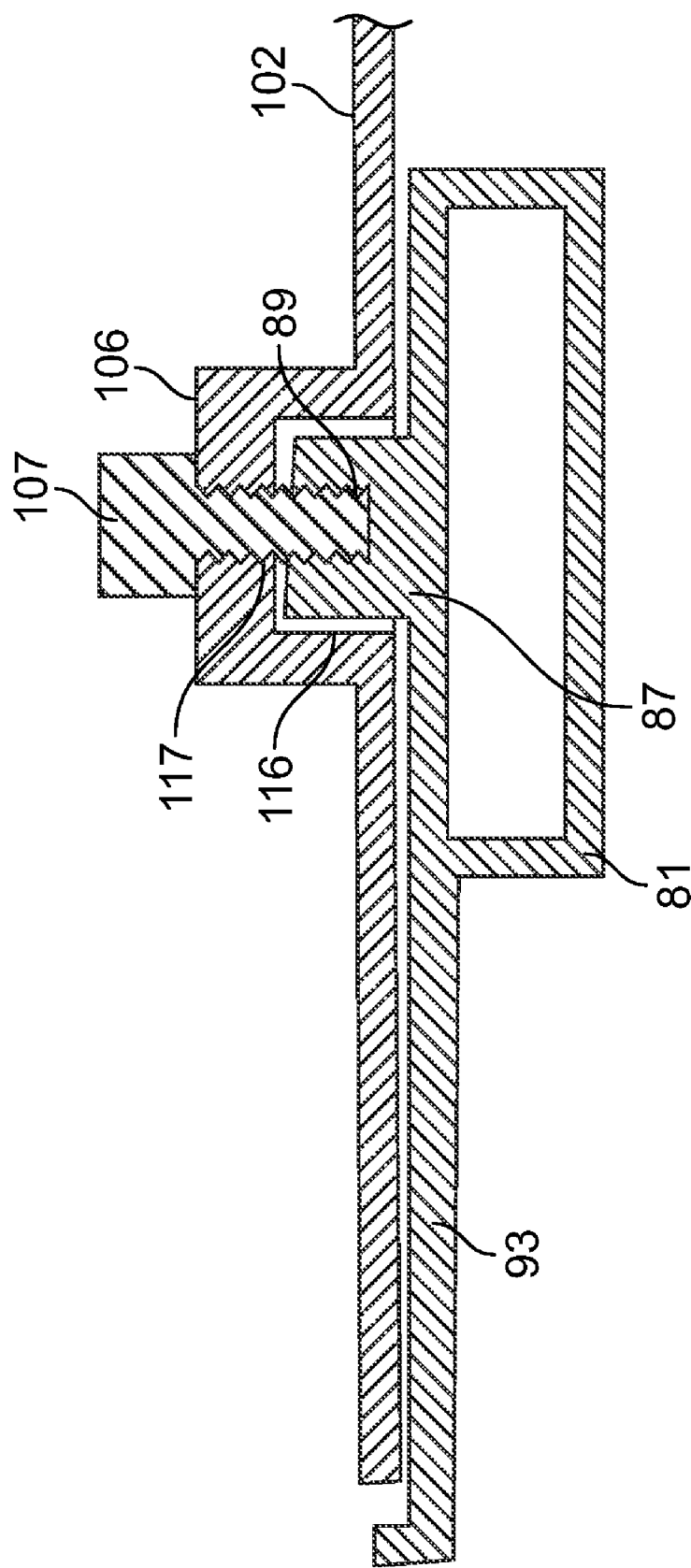

Referring to FIGS. 6A and 6B, the protractor member 100 includes a chassis 102 extending from a proximal end 103 to distal end 104 along a center axis 105. The chassis 102 includes a projection 106 centered about the center axis 105. The projection 106 defines a counter-bore 116, which is sized to fit over the second protrusion 87 of the carriage 80, as shown in FIG. 6C. The projection 106 also includes a threaded through hole 117 which extends into the counter-bore 116, allowing a fourth threaded fastener 104 to pass through the projection 106 and into contact with the counter-bore 89 of the carriage 80. The fourth threaded fastener 107 can be adjusted against the counter-bore 89 to urge the projection 106 into contact with the chassis 102, thereby clamping the chassis 102 between the projection 106 and the second protrusion 87 of the carriage 80 to prevent or inhibit rotational movement of the protractor member 100 about the axis of rotation 101.

An arcuate protractor 109 is disposed at the distal end 104 of the chassis 102. The arcuate protractor 109 includes a protractor scale 110 arranged symmetrically about the center axis 105 of the chassis 102. The protractor scale 110 is configured to cooperate with the third position marker 94 to provide a measurement corresponding to an angular orientation of the center axis 105 of the protractor member 100 relative to the longitudinal axis 25 of the carriage 20.

Referring still to FIGS. 6A and 6B, the protractor member 100 also includes a spirit level 112 disposed at the proximal end 103 of the chassis 102. The spirit level 112 is housed in a casing 113 that is mounted to the chassis 102. The spirit level 112 allows an operator to visibly ascertain an orientation of the protractor member 100 relative to ground, during use.

The protractor member 100 also includes first and second sight members 114, 115 which are aligned with the center axis 105. During use, as described below, the sight members 114, 115 can be used to aid the operator in visibly aligning the center axis 105 of the protractor member 100 with a reference point, e.g., for measuring an angle between a position of the longitudinal axis 24 of the main body member 20 and the reference point.

The components of the instrument 10, including the main body member 20, the mounting member 40, the mounting hardware 60, the carriage 80, and the protractor member 100, can be formed, for example, from metal (e.g., aluminum, steel, etc.) or plastic. The components can be formed, e.g., by stamping, extrusion, molding, machining and combinations thereof.

Figure 7A:
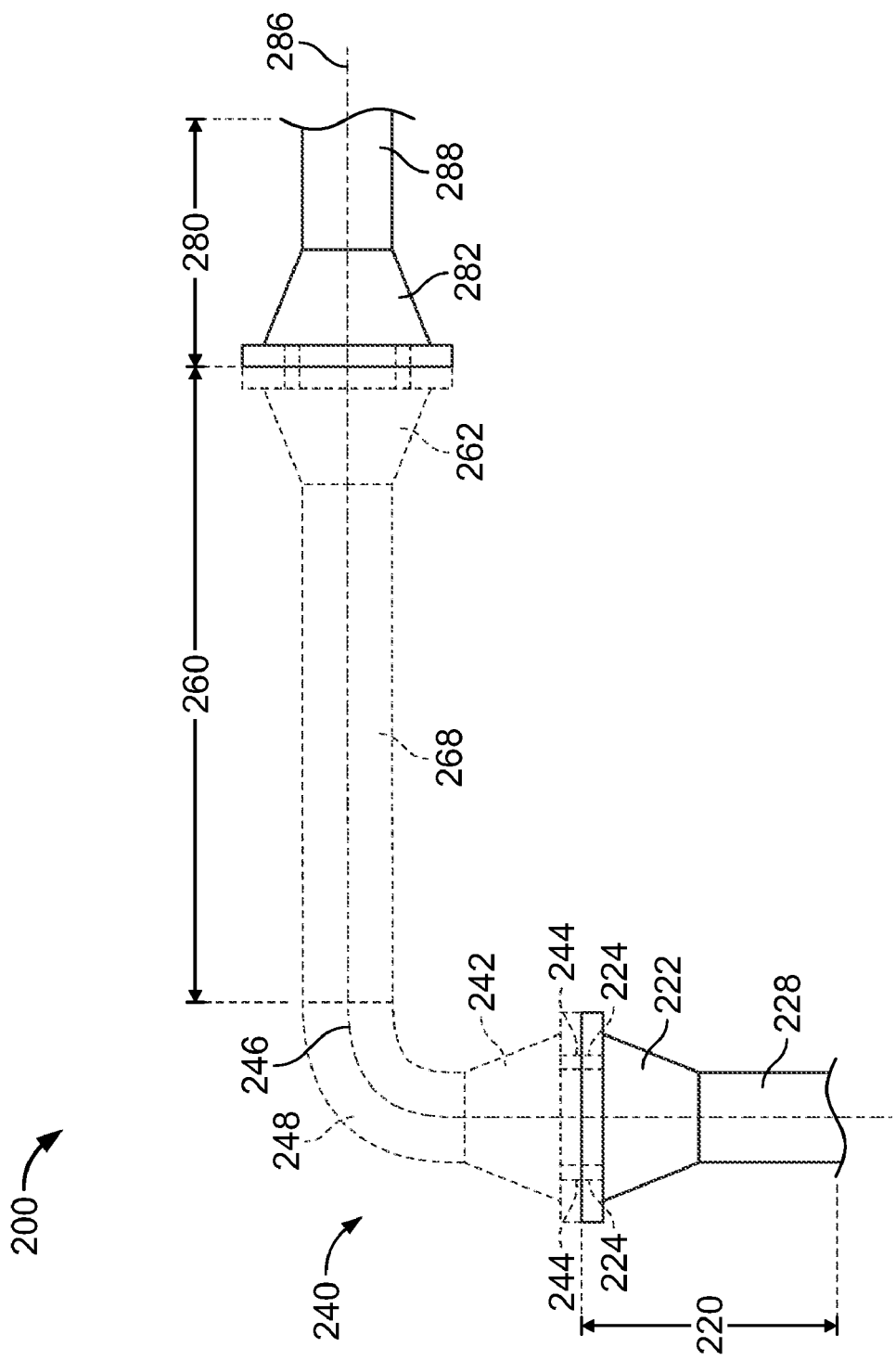
FIGS. 7A and 7B are side and plan views of a piping layout.
Figure 7B:
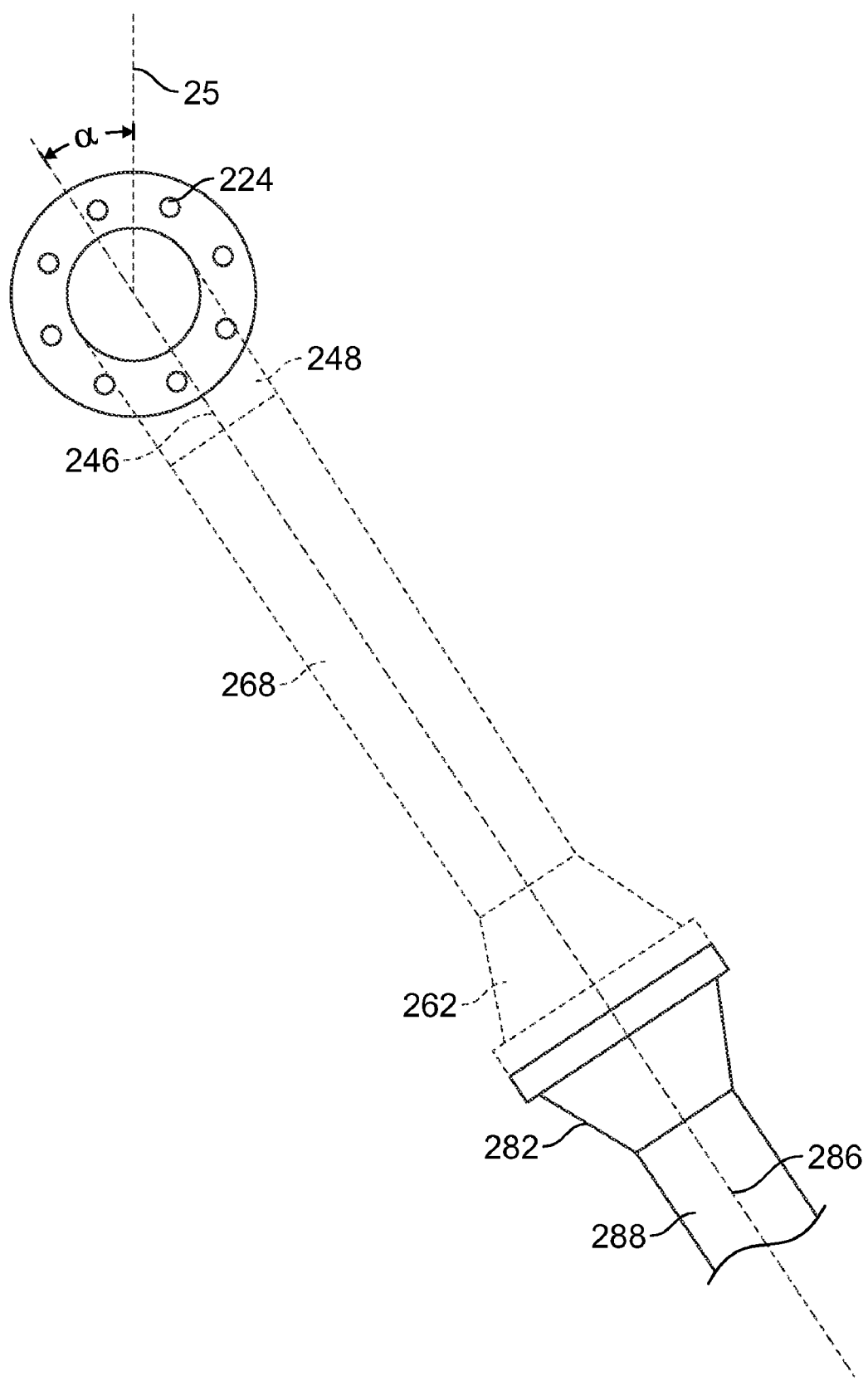

A pipefitting instrument of the type described above can be used for aligning sequential sections of pipe according to a predetermined layout or plan. More specifically, the pipefitting instrument 10 can be used for aligning successive pipe sections that transition between a vertical orientation to a horizontal orientation. For example, FIGS. 7A-7B, illustrate a predetermined and partially preexisting piping layout 200. The piping layout 200 includes a first pipe section 220, a second pipe section 240, a third pipe section 260, and a fourth pipe section 280. The first pipe section 220 includes a first pipe 228 and a first pipe flange 222. The second pipe section 240 includes a second pipe flange 242 and a second pipe (i.e., elbow joint 248). The third pipe section 260 includes a third pipe 268 and a third pipe flange 262. The fourth pipe section 280 includes a fourth pipe flange 282 and a fourth pipe 288. For the purpose of this example, the first and fourth pipe sections 220, 280 represent fixed sections of pipe (i.e., fixed in place, e.g., pre-existing at a job site). The second and fourth pipe sections 240, 260 represent pipe sections that are to be fitted between the first and fourth pipe sections 220, 280 (i.e., to complete the layout).

As shown in FIG. 7B, the instrument 10 can be used to determine an angular orientation of mounting holes 224 of the first pipe flange 222, e.g., a horizontally oriented pipe flange, relative to a central axis 286 of a fourth pipe flange 282, e.g., a vertically oriented pipe flange. The angular orientation α can then be used to adjust a position of the elbow joint 248 relative to the second pipe flange 242. The elbow joint 248 can then be welded to the second pipe flange 242 in the adjusted position such that, when the mounting holes 244 of second pipe flange 242 are aligned with the mounting holes 224 of the first pipe flange 222, a central axis 246 of the elbow joint 248 is substantially co-axially aligned with the central axis 286 of the fourth pipe flange 282. With the elbow joint 248 and the fourth pipe flange 282 being properly aligned, the third pipe section 260 can be fastened between the elbow joint 248 and the fourth pipe flange 282 to complete the layout.

Figure 8A:
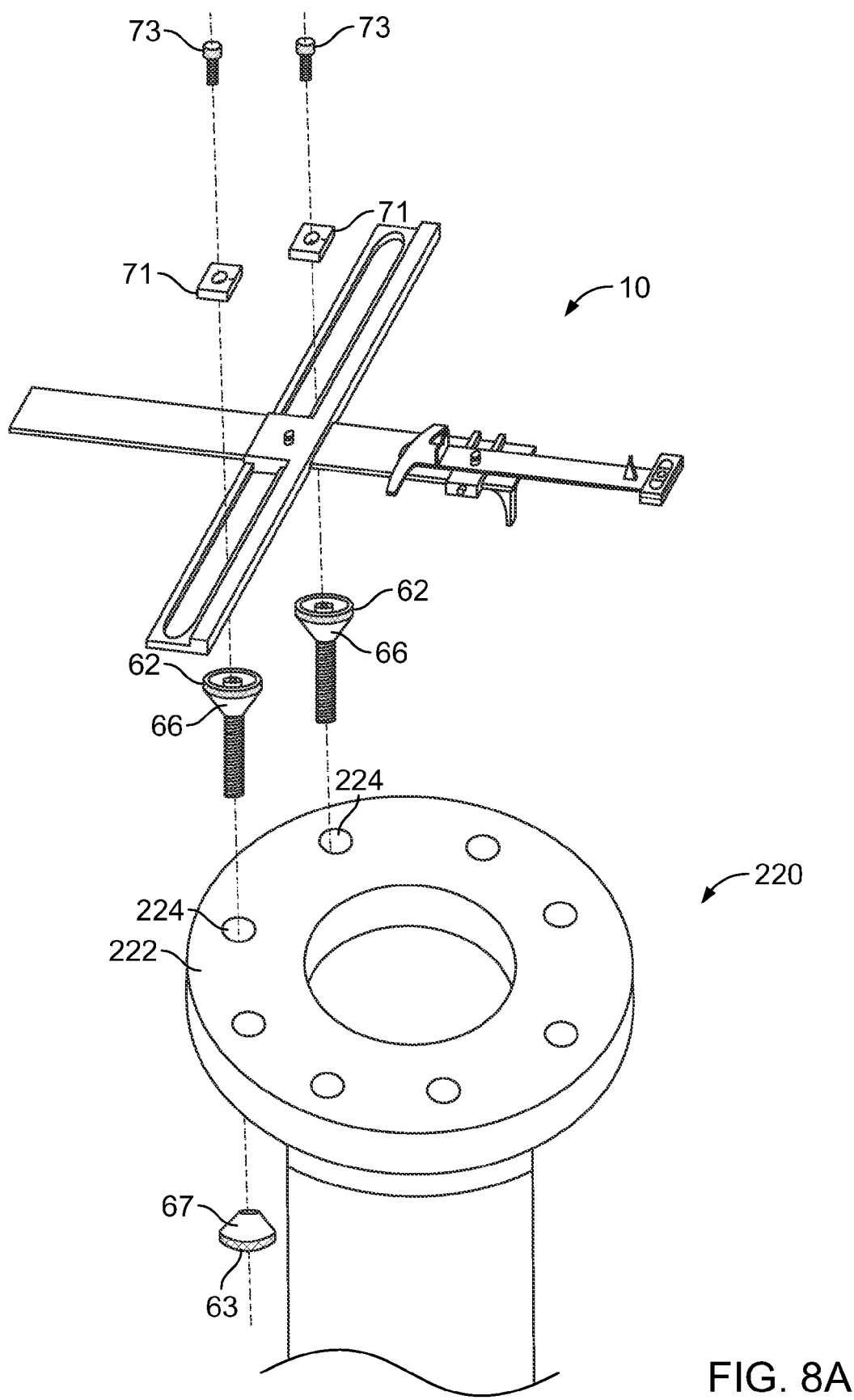
FIGS. 8A-8L illustrate alignment of adjoining segments of pipe utilizing a pipefitting instrument.

In use, as illustrated in FIG. 8A, the pair of two-hole pins 61 are mounted to adjacent mounting holes 224 in the first pipe flange 222. The first and second pin members 62, 63 are inserted into opposing ends of a corresponding one of the mounting holes 224, and are fastened together locking the pin 61 in place in the mounting hole 224. During insertion, because of the tapered surfaces 66, 67, the two-hole pins 61 are self-centering. With the two-hole pins 61 in place in the first pipe flange 222, the mounting member 40 is loosely fastened to the pins 61 with the second threaded fasteners 73.

Figure 8B:
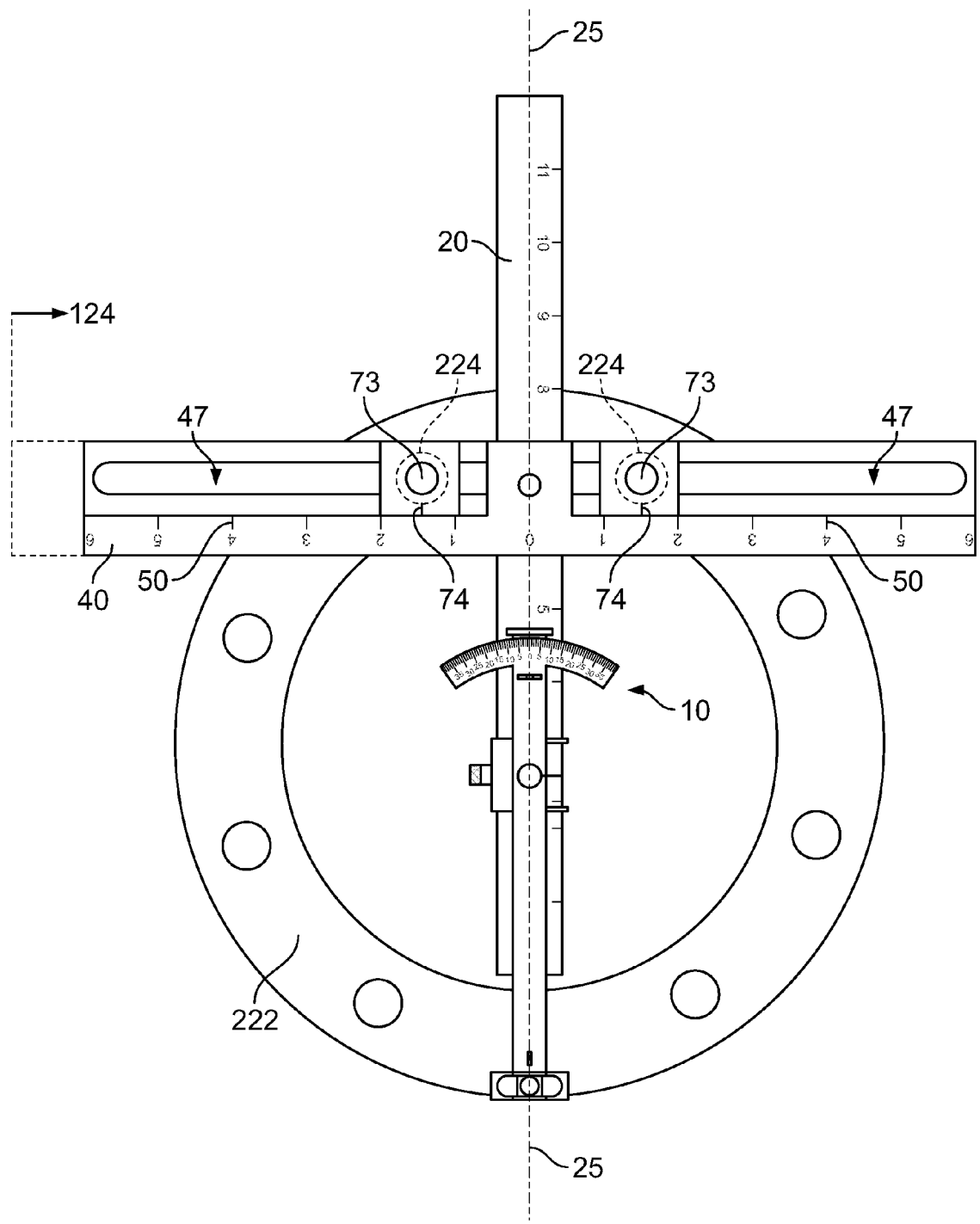

Referring to FIG. 8B, once the mounting member 40 is fastened to the first pipe flange 222, the instrument 10 is linearly displaced relative to the first pipe flange 222 to arrange the longitudinal axis 25 of the main body member 20 centrally between the adjacent mounting holes 224 (i.e., between second threaded fasteners 73). This can be achieved by sliding the mounting member 40 along the elongate slots 47 (as indicated by arrow 124) to a position where each of the fasteners 73 are at a common distance relative to the longitudinal axis 25 of the main body member 20, as indicated by the location first position markers 74 in relation to the series of graduations 50. Once the instrument 10 is positioned such that the longitudinal axis 25 is arranged substantially centrally between the adjacent mounting holes 224, the second threaded fasteners 73 can be tightened against the two-hole pins 61 to prevent or inhibit further displacement of the mounting member 40 relative to the first flange 201.

Figure 8C:
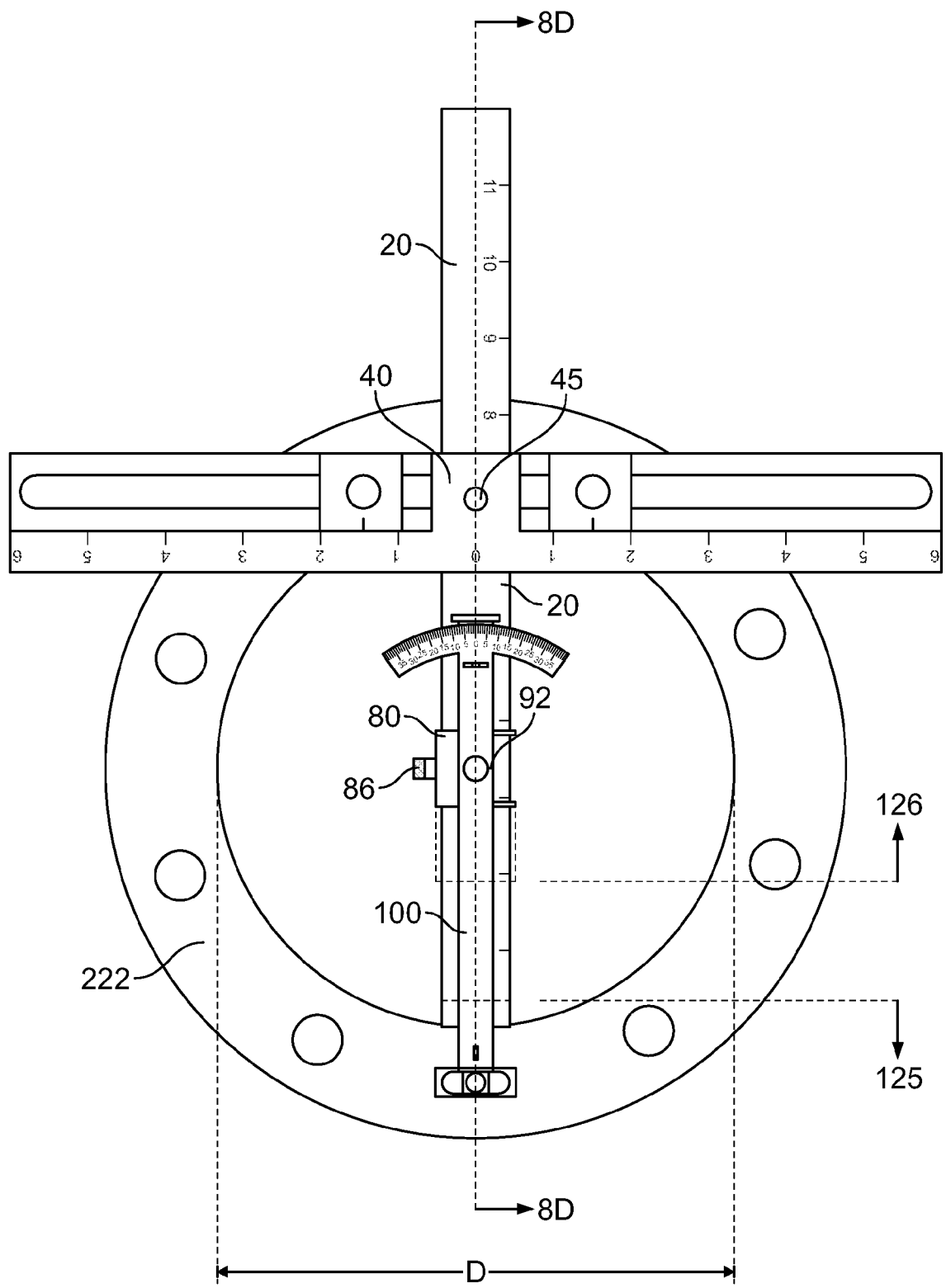
Figure 8D:
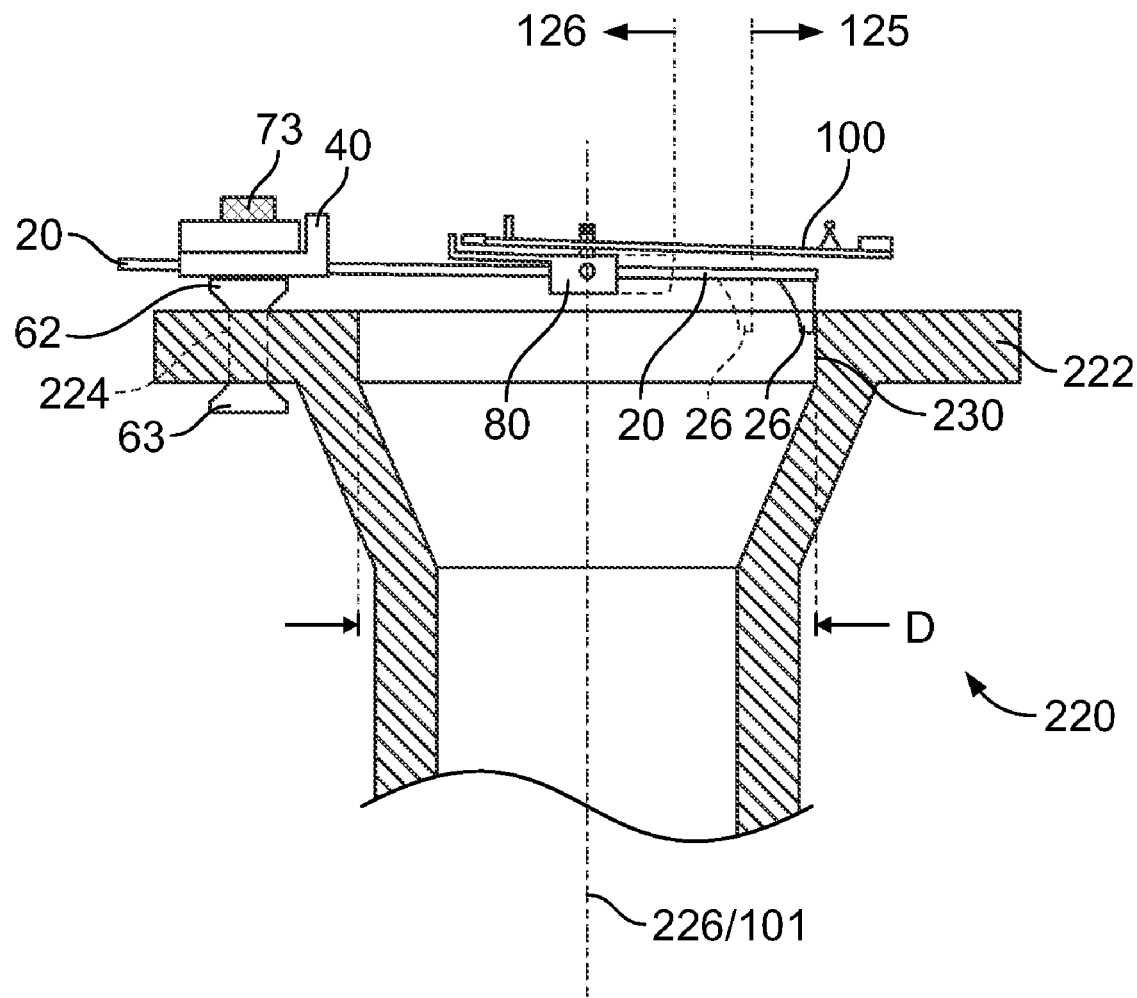

Next, referring to FIGS. 8C and 8D, the main body member 20 is displaced relative to the mounting member 40 (as indicated by arrow 125) to place the projection 26 in contact with an inner wall 230 of the first pipe flange 222, as shown in FIG. 8D. With the projection 26 in position against the inner wall 230, the first threaded fastener 45 (FIG. 8C) can be tightened to inhibit or prevent further displacement of the main body member 20 relative to the mounting member 40. In this position, the projection 26 serves as a reference point for locating the central axis 226 of the first pipe flange 222. More specifically, with the projection 26 positioned against the inner wall 230 of the first pipe flange 222, and with an inner diameter D of the first pipe flange 222 known, the carriage 80 can be displaced along the main body member 20 (as indicated by arrow 126) to align the second position marker 92 with a position along the sequence of ruled graduations 28 corresponding to the central axis 226 of the first pipe flange 222, thereby aligning the axis of rotation 101 of the protractor member 100 with the central axis 226 of the first pipe flange 222, as shown in FIG. 8D. The third threaded fastener 86 (FIG. 8C) can then be tightened against the main body member 20 to inhibit or prevent further movement of the carriage 80.

Figure 8E:
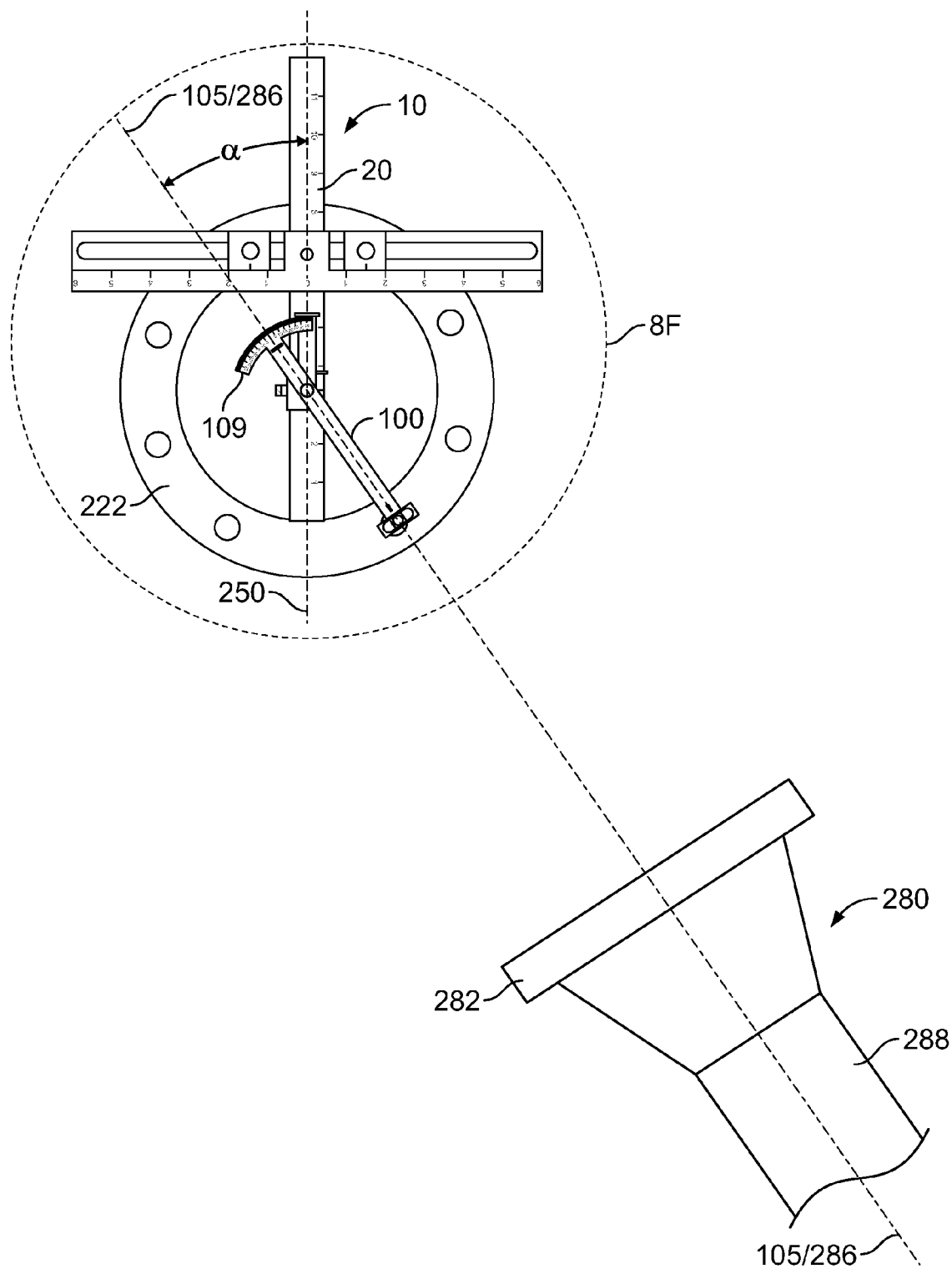
Figure 8F:
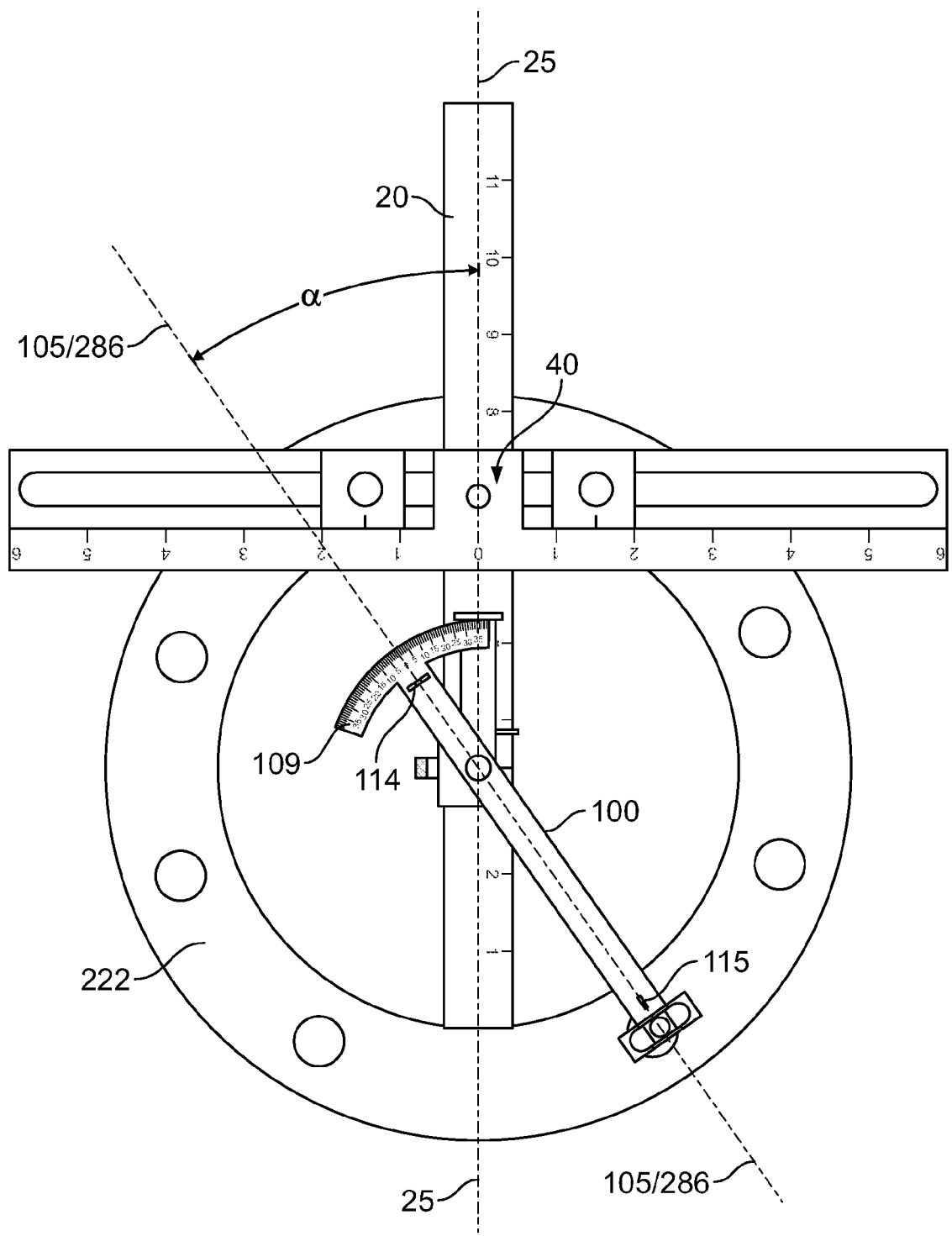

Referring to FIGS. 8E and 8F, with the axis of rotation of the protractor member 100 aligned with the central axis 226 of the first pipe segment 222, the protractor member 100 can be rotated to align (e.g., with the aid of the first and second sight members 114, 115) the center axis 105 of the protractor member 100 with the fourth pipe flange 282 (i.e., such that the center axis 105 is co-planar with the central axis 286 of the fourth pipe flange 282). With the protractor member 100 so aligned, the angle of incidence α between the central axis 286 of the fourth pipe flange 282 and the longitudinal axis 25 of the main body member 20 can be measured off the protractor 109.

The angle α can then be used to adjust a position of the second flange 242 relative to the elbow joint 248 such that, when the second pipe flange 242 is arranged in the predetermined position relative to the first pipe flange 222, the mounting holes 244 of the second flange are substantially aligned with the mounting holes 224 of the first flange 222, and the central axis 246 of the elbow joint 248 is substantially co-axially aligned with the central axis 286 of the fourth pipe flange 282.

Figure 8G:
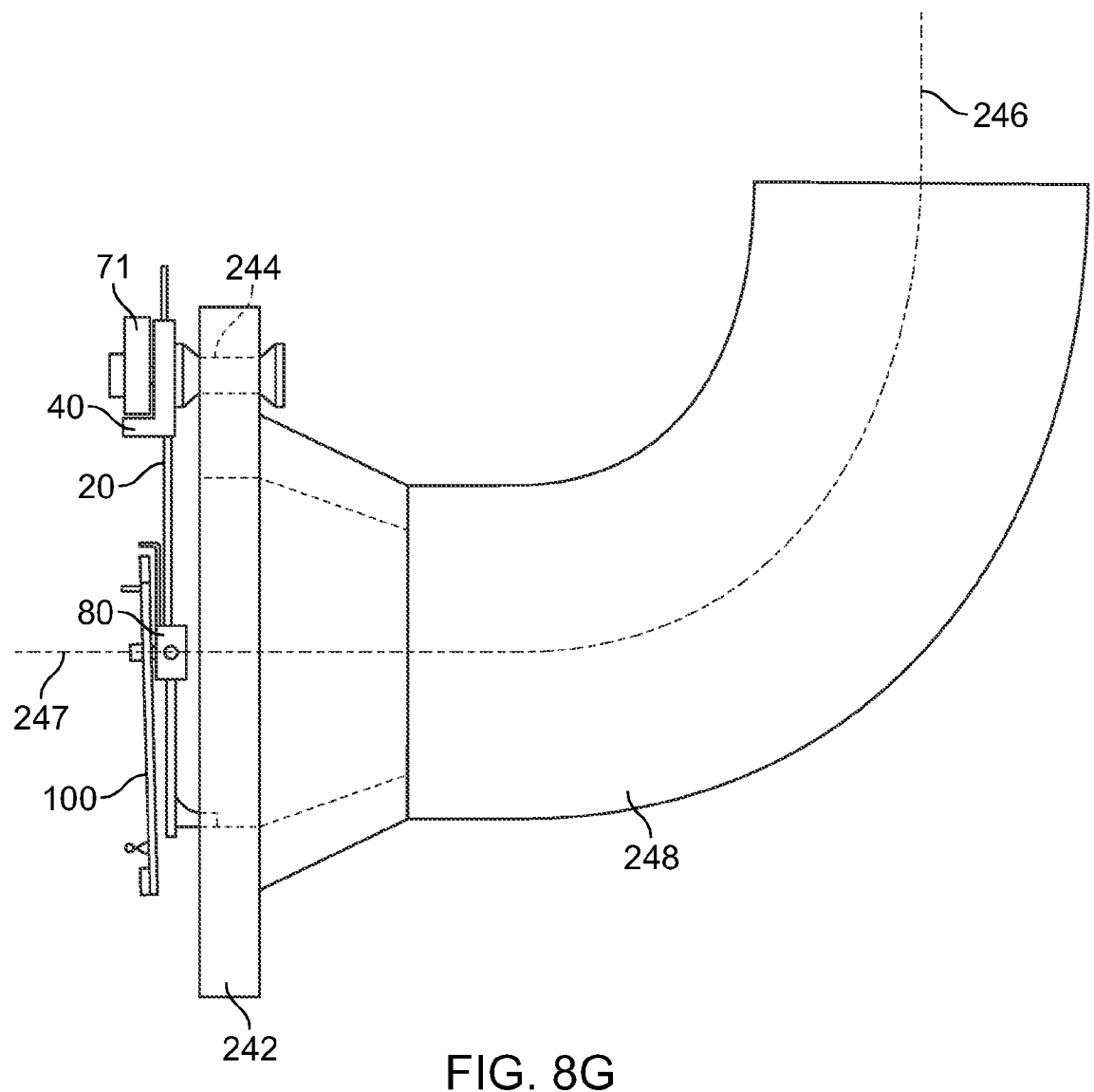
Figure 8H:
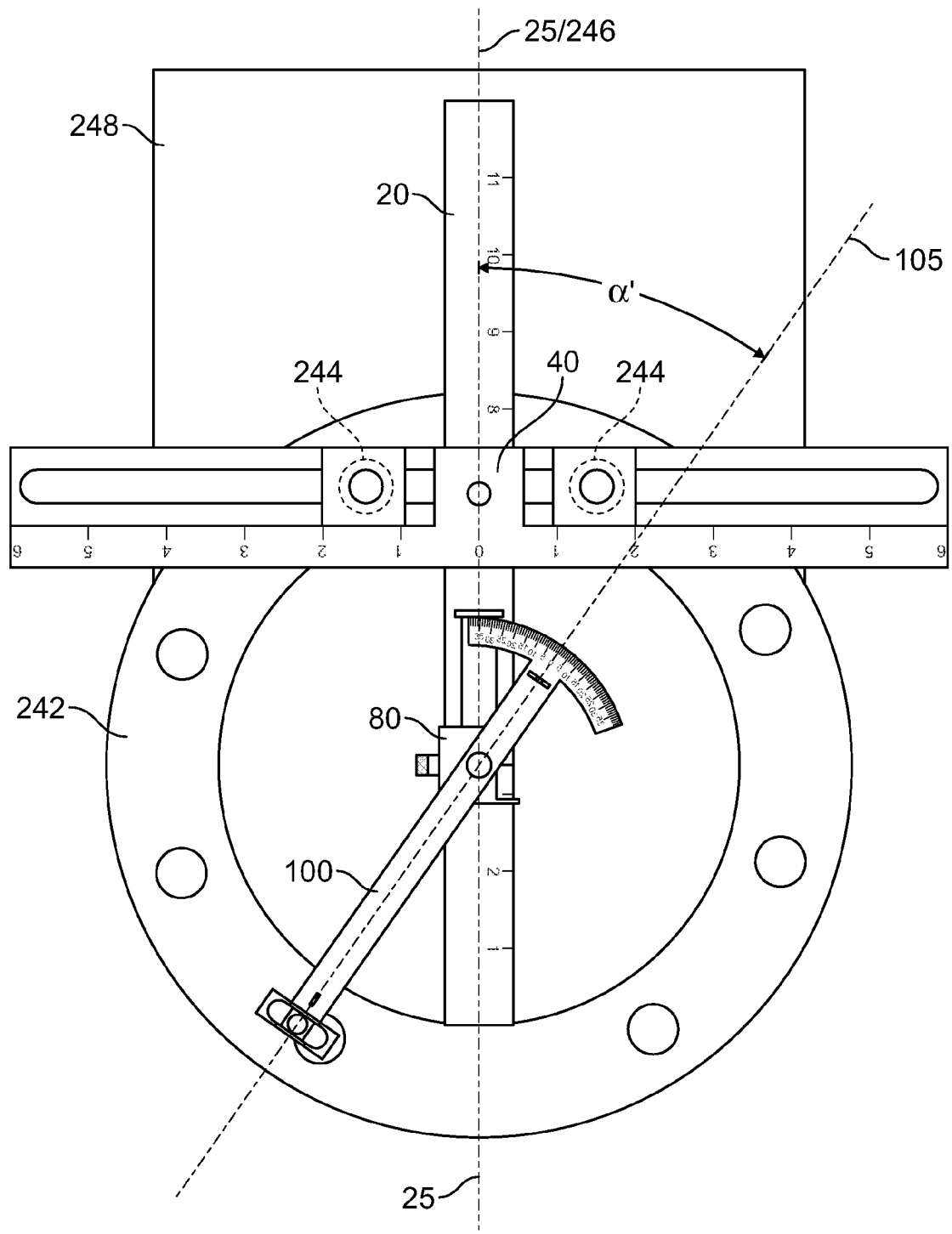

For example, referring to FIGS. 8G and 8H, the instrument 10 can be mounted to adjacent mounting holes 244 of the second flange 242 and adjusted, as described above, such that the longitudinal axis 25 of the main body member 20 is positioned centrally between the adjacent mounting holes 244 and such that the axis of rotation 101 of the protractor member 100 is aligned with the central axis 247 of the second pipe flange 242. Next, the protractor member 100 can be rotated, relative to the main body member 20, such that the center axis 105 is arranged at a predetermined angle α' relative to the longitudinal axis 25 of the main body member 20, as shown in FIG. 8H. The angle α' being congruent to angle α and taking into account the mirrored relationship between the mating surfaces of the first and second flanges 222, 242.

Figure 8I:
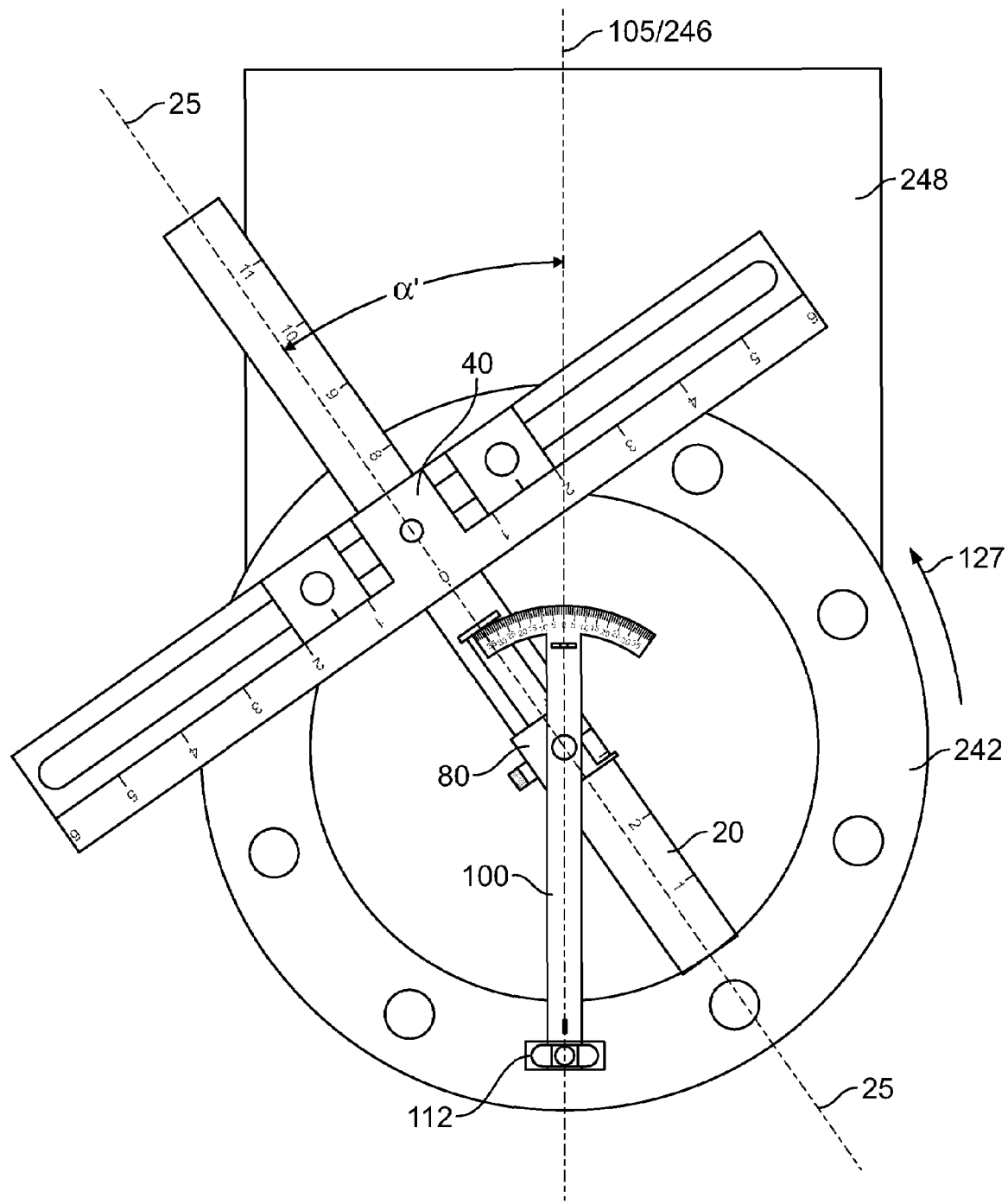

With the protractor member 100 arranged at the angle α, the elbow joint 248 is positioned adjacent the second pipe flange 242 with the central axis 246 of the elbow joint 248 arranged in a vertical orientation. Then, the second flange 242 is rotated (as indicated by arrow 127) relative to the elbow joint 248 to align the center axis 105 of the protractor member 100 with the central axis 246 of the elbow joint 248, as shown in FIG. 8I. To this end, the second flange 242 can be rotated relative to the elbow joint 248 to a position where the spirit level 112 shows a level reading, indicating alignment of the center axis 105 of the protractor member 100 with the central axis 247 of the second pipe flange 242. With the second pipe flange 242 and the elbow joint 248 arranged in this manner the second flange 242 can be welded in place to the elbow joint 248.

Figure 8J:
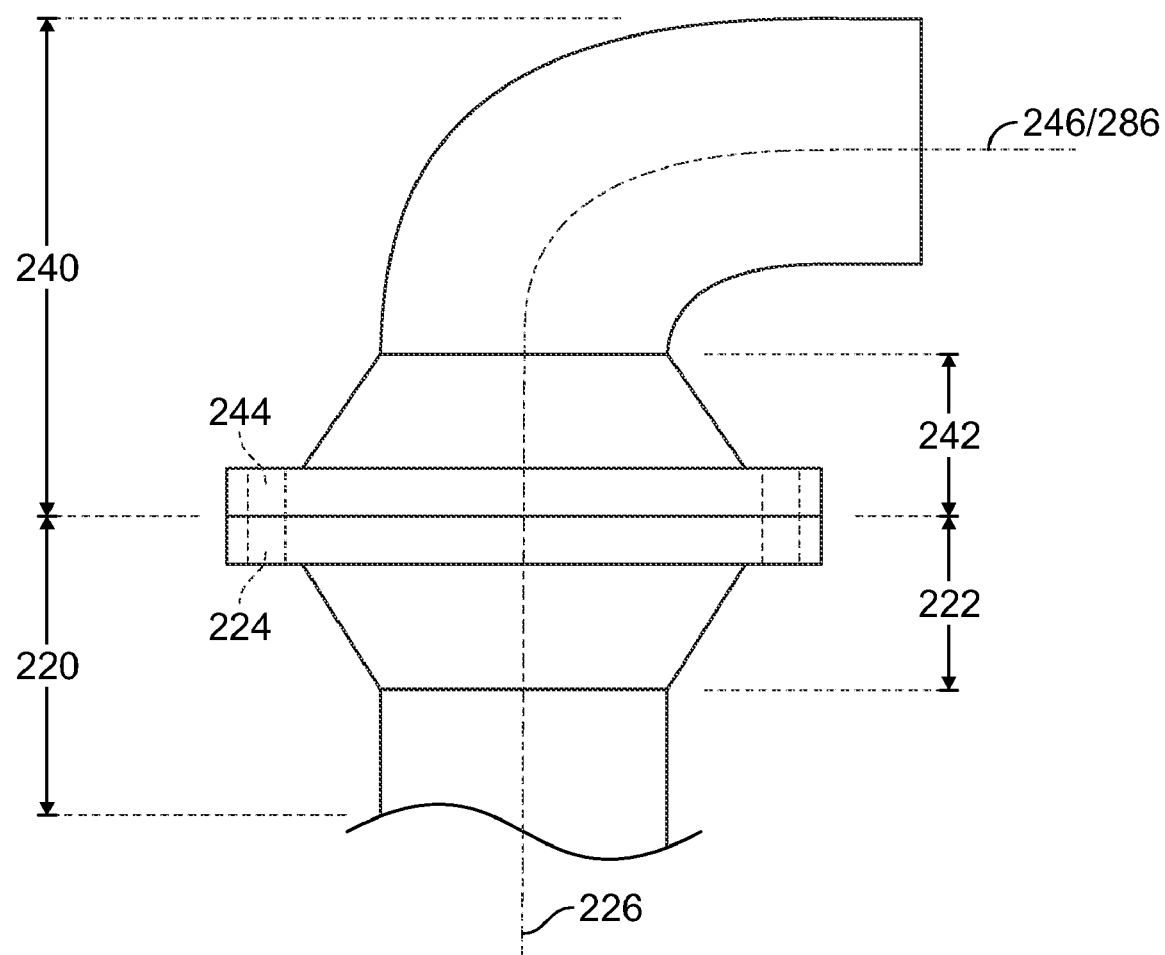
Figure 8K:
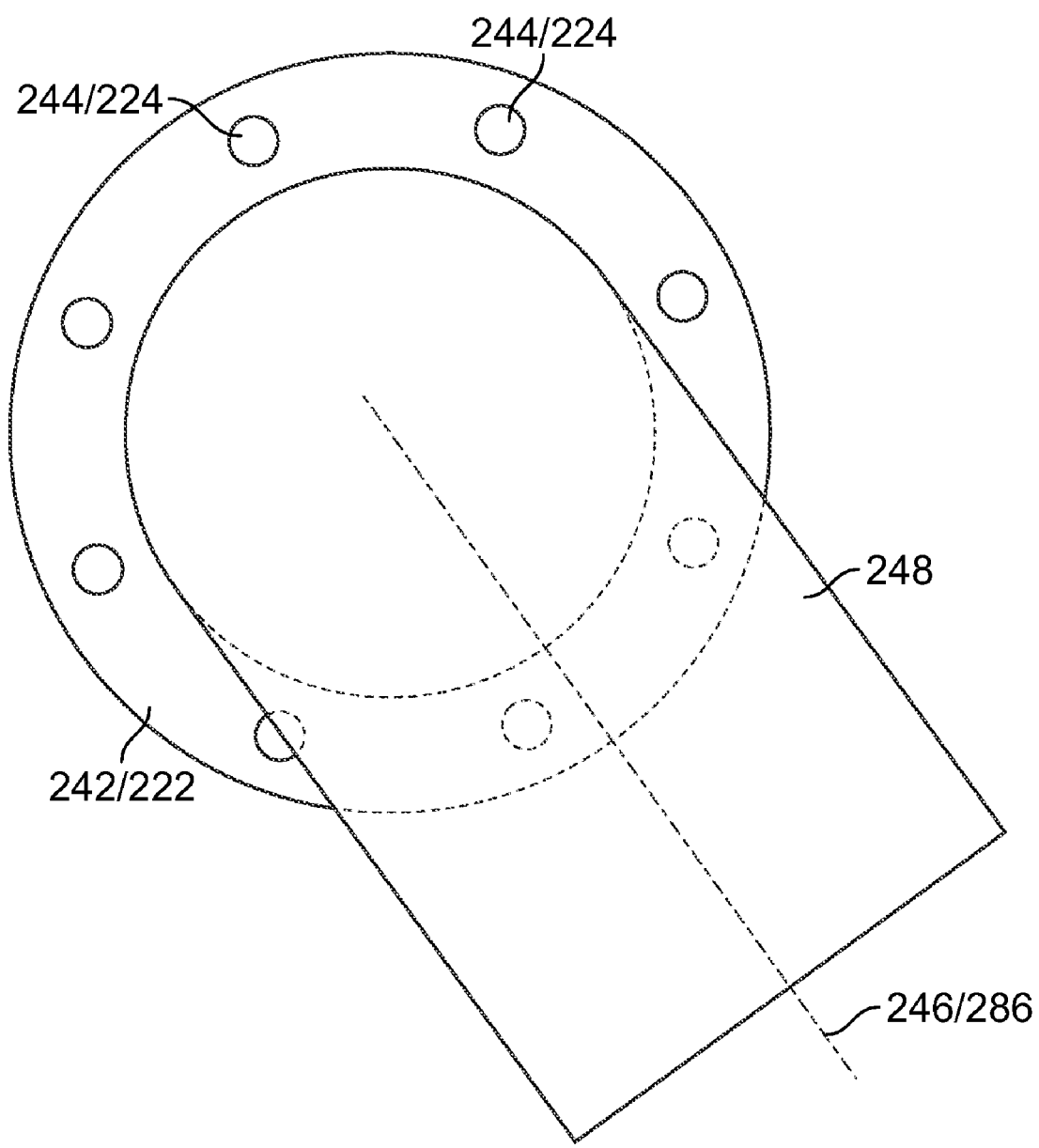
Figure 8L:
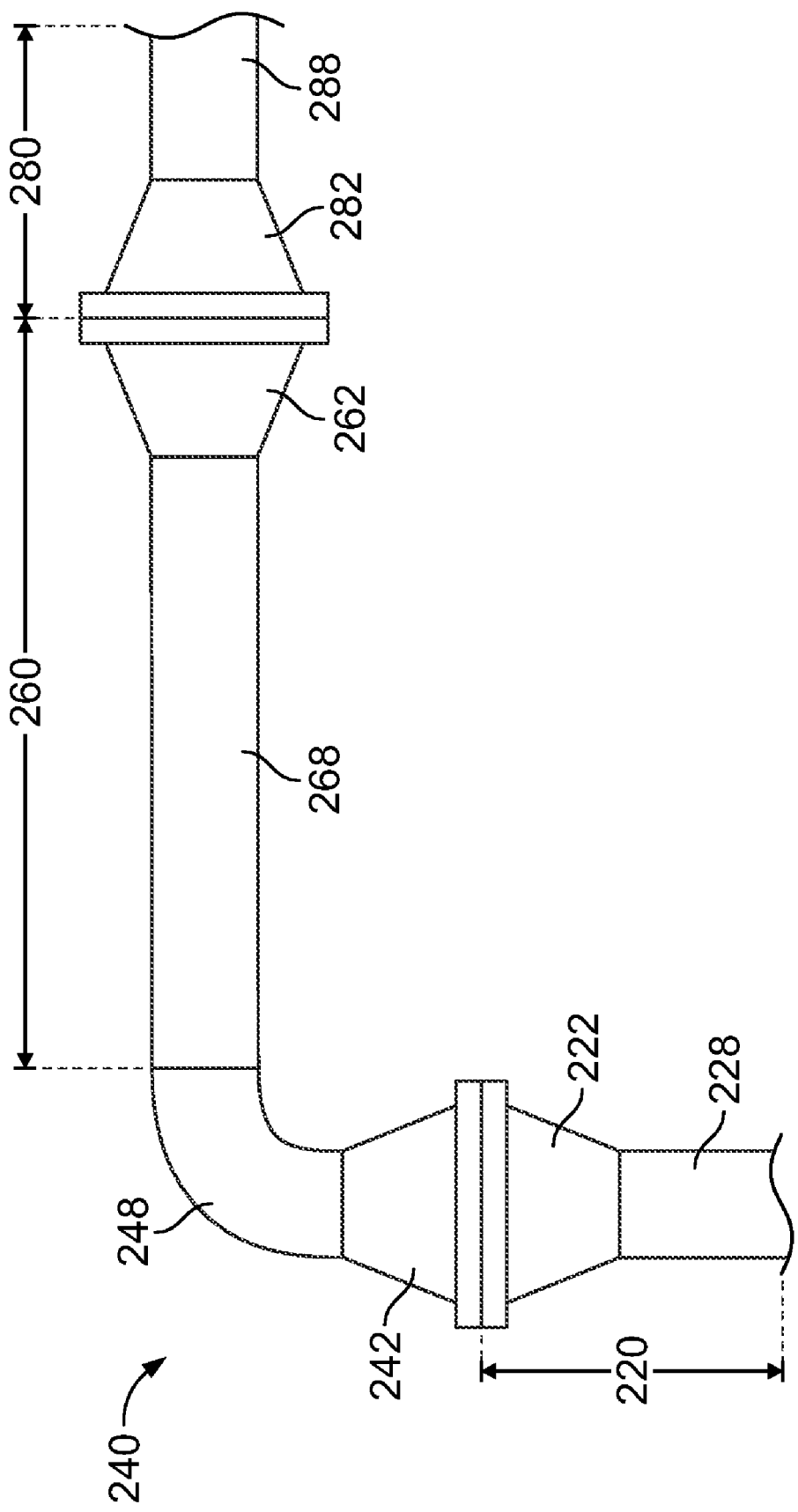

With the second pipe flange 242 fixed to the elbow joint 248, the second pipe flange 242 can be connected to the first pipe flange 222, as shown in FIG. 8J. Since the second pipe flange 242 has been aligned relative to the elbow joint 248 as described above, the mounting holes 244 of the second pipe flange 242 will be substantially aligned with the mounting holes 224 of the first pipe flange 222 when the central axis 246 of the elbow joint 248 is aligned co-axially with the central axis 286 of the fourth pipe flange 282, as shown in FIGS. 8J and 8K. Then, third pipe section 260 can be connected between the fourth pipe flange 282 and the elbow joint 248 to complete the piping layout 200, as shown in FIG. 8L.

Thus, once the angle α has been determined using the instrument 10 the second pipe section 240 can be assembled off-site (i.e., remotely), with the aid of the instrument 10 in order to achieve an aligned, predetermined fit with both the first pipe section 220 and the fourth pipe section 280.

While certain embodiments have been described, various modifications may be made without departing from the spirit and scope of the invention. Accordingly, other embodiments are within the scope of the following claims.

What is claimed is:

1. A pipefitting instrument comprising:
   a main body member;

a carriage slidably connected to the main body member;
a protractor member pivotally connected to the carriage and including a protractor scale operable to measure an angular orientation of the protractor member relative to the main body member; and
a mounting member slidably connected to the main body member and configured to releasably attach to a pipe flange.

2. The pipefitting instrument according to claim 1, further comprising a level connected to the protractor member.

3. The pipefitting member according to claim 1, wherein the mounting member includes a series of graduations corresponding to measured distances relative to the main body member.

4. The pipefitting member according to claim 3, wherein the mounting member comprises a first mounting arm including an elongate slot, and wherein the series of graduations correspond to measured distances along the slot relative to the main body member.

5. The pipefitting member according to claim 4, wherein the mounting member comprises a first mounting pin linearly displaceable along the elongate slot and operable to form a releasable connection with a mounting hole of a pipe flange, during use.

6. The pipefitting member according to claim 5, wherein the mounting member further comprises:
a second mounting arm including a second elongate slot; and
a second mounting pin linearly displaceable along the second elongate slot, and wherein the mounting member is operable to mount the main body member between adjacent mounting holes of a pipe flange, during use.

7. The pipefitting instrument according to claim 5, wherein the first mounting pin includes a position marker configured to cooperate with the series of graduations to provide a measurement corresponding to a position of the mounting pin relative to the main body member.

8. The pipefitting instrument according to claim 5, wherein the first mounting pin is configured for self-centering engagement with a mounting hole of a pipe flange.

9. The pipefitting instrument according to claim 8, wherein the first mounting pin comprises:
a first pin member comprising a first tapered surface;
a second pin member configured to releasably engage the first pin member and comprising a second tapered surface, wherein the first and second tapered surfaces are operable to substantially center the mounting pin within a mounting hole; and
a first fastener configured to releasably engage the first pin member and operable to inhibit linear displacement of the first mounting pin relative to the mounting member.

10. The pipefitting instrument according to claim 9, wherein the first fastener is operable to connect the mounting member to the first mounting pin.

11. The pipefitting instrument according to claim 1, wherein the protractor member includes a releasable fastener operable to inhibit movement of the protractor member relative to the main body member.

12. The pipefitting instrument according to claim 1, wherein the mounting member includes a first releasable fastener operable to inhibit linear displacement of the body member relative to the mounting member.

13. The pipefitting instrument according to claim 1, wherein the main body member includes a projection extending outwardly from a first surface of the main body member and operable to limit linear displacement of the main body member in a first direction, relative to the mounting member, during use.

14. The pipefitting instrument according to claim 13, wherein the main body member includes a sequence of graduations corresponding to measured distances relative to the projection, and
wherein the carriage includes a position marker being operable, in cooperation with the sequence of graduations, to measure a position of an axis of rotation of the protractor member relative to the main body member.

15. The pipefitting instrument according to claim 1, wherein the carriage includes a releasable fastener operable to inhibit linear displacement of the carriage relative to the main body member.

16. The pipefitting instrument according to claim 1, wherein the carriage includes a position marker configured to cooperate with the protractor scale to provide a measurement for an angular orientation of the protractor member relative to the main body member.

17. A method comprising:
mounting a graduated instrument to adjacent ones of a plurality of mounting holes of a first pipe flange;
measuring an angular orientation of the mounting holes of the first pipe flange relative to a central axis of a second pipe flange with the graduated instrument;
adjusting a position of a third pipe flange relative to an elbow joint based at least in part on the measured angular orientation; and
welding the third pipe flange to the elbow joint in the adjusted position.

18. The method of claim 17, wherein the graduated instrument includes a spirit level, and wherein adjusting the position of the third pipe flange relative to the elbow joint comprises:
mounting the graduated instrument to the third pipe flange;
adjusting the spirit level to a predetermined angle relative to the third pipe flange; and
rotating the third flange, relative to the elbow joint, to a position where the spirit level indicates a level orientation of the graduated instrument.

19. The method of claim 18, wherein the predetermined angle corresponds to the measured angular orientation.

20. The method of claim 17, further comprising mounting the third pipe flange to the first pipe flange such that a central axis of the elbow joint is substantially co-axially aligned with the central axis of the second pipe flange,
wherein at least one of a plurality of mounting holes of the third pipe flange is substantially aligned with a corresponding one of the plurality of mounting holes of the first pipe flange.

21. The method of claim 17, wherein a central axis of the first pipe flange is substantially perpendicular to the central axis of the second pipe flange.

* * * * *